United States Patent [19]
Hornick

[11] Patent Number: 5,270,921
[45] Date of Patent: Dec. 14, 1993

[54] VIRTUAL FARE METHODS FOR A COMPUTERIZED AIRLINE SEAT INVENTORY CONTROL SYSTEM

[75] Inventor: Scot W. Hornick, Naperville, Ill.

[73] Assignee: Andersen Consulting, Chicago, Ill.

[21] Appl. No.: 640,077

[22] Filed: Jan. 11, 1991

Related U.S. Application Data

[63] Continuation-in-part of Ser. No. 630,261, Dec. 19, 1990.

[51] Int. Cl.$^5$ ............................................. G06F 15/26
[52] U.S. Cl. ................................... 364/407; 364/401; 364/403
[58] Field of Search ........................ 364/407, 401, 403

[56] References Cited

U.S. PATENT DOCUMENTS

| | | | |
|---|---|---|---|
| 2,542,890 | 2/1951 | Basu et al. | 340/825.37 |
| 2,883,106 | 4/1959 | Cornwell et al. | 235/385 |
| 4,862,357 | 8/1989 | Ahlstrom et al. | 364/407 |

OTHER PUBLICATIONS

W. H. Press, B. P. Flannery, S. A. Teukolsky, and W. T. Vetterling, "Numerical Recipes," Cambridge University Press, 1986, pp. 300–307.
D. G. Luenberger, "Introduction to Linear and Nonlinear Programming," Addison-Wesley Publishing Company, 1973, pp. 168–188.
S. L. Brumele, J. I. McGill, T. H. Oum, K. Sawaki and M. W. Tretheway "Allocation of Airline Seats between Stochastically Dependent Demands," Trans. Science, vol. 24, No. 3, Aug. 1990.
R. W. Simpson, "Using Network Flow Techniques to Find Shadow Prices for Market Demands and Seat Inventory Control", Flight Trans. Lab Memorandum M89-1, Jan. 1989.
E. L. Williamson and P. P. Belobaba, "Optimization Techniques for Seat Inventory Control," Proceedings of the 28th Annual AGIFORS Symposium, 1988.
A. Jessop, "Optimal Seat Allocation for Airline Planning," 5th International Symposium on Forecasting, 1985.
R. E. Curry, "Optimal Airline Seat Allocation with Fare Classes Nested by Origins and Destinations," Trans. Science, vol. 24, #3 Aug. 1990.
P. P. Belobaba, "Application of a probabilistic decision model to airline seat inventory control," 37 Oper. Rsrch No. 2, Mar. 1989.
F. Glover, R. Glover, J. Lorenzo, and C. McMillan, "The passenger-mix problem in the scheduled airlines," 12 Interfaces #3, Jun. 1982.

(List continued on next page.)

Primary Examiner—Roy N. Envall, Jr.
Assistant Examiner—Gita Shingala
Attorney, Agent, or Firm—Merchang, Gould, Smith, Edell, Welter & Schmidt

[57] ABSTRACT

An airline seat reservation system wherein seat reservations are controlled using, in part, a computerized seat inventory control system. The seat inventory control system, based on a concept termed Network-Based Expected Marginal Seat Revenue (EMSR), does not require the large number of variables required by the other network-based approaches, and it incorporates a probabilistic demand model without resorting to computationally intractable integer programming. The seat inventory control system uses iterative leg-based methods to control bookings in a flight network comprised of a plurality of itinerary/fare class combinations using a plurality of flight legs. When considering a particular flight leg, the total fare paid by a passenger using the leg is adjusted by taking into account an estimate of the displacement cost of the travel on the other legs of the itinerary to create a virtual fare. Expected marginal seat revenues (or more precisely, their current approximations) provide the displacement costs on the legs when computing virtual fares. Using these virtual fares, a leg-based optimization method is applied to the individual legs one-by-one to compute new approximations of the expected marginal seat revenues. This method is iterated until the expected marginal seat revenues concerge to their network-optimal values.

22 Claims, 27 Drawing Sheets

OTHER PUBLICATIONS

R. D. Wollmer, "An airline reservation model for opening and closing fare classes," Unpublished Internal Rpt., McDonnell-Douglas Corp. 1985.

M. Mayer, "Seat allocation, or a simple model of seat allocation via sophisticated ones," 16th Annual Symposium of AGIFORS, Sep. 1976.

S. Dembo & T. Steihaug, "Truncated-Newton algorithms for large scale unconstrained optimization," Mathematical Prog. 26, 1983.

D. P. Adhlfeld, J. M. Mulvey, R. S. Dembo, and S. A. Zenios, "Nonlinear programming on generalized networks," 13 ACM Transactions on Mathematical Software No. 4, 1987.

K. Littlewood, "Forecasting and control of passenger bookings," Proceedings of the 12th AGIFORS Symposium, Oct. 1972, pp. 95-117.

H. Richter, "The differential revenue method to determine optimal seat allotments by fare type," Proceedings of the 22nd AGIFORS Symposium Oct. 1982.

P. P. Belobaba, "Air travel demand and airline seat inventory management," Technical Rpt FTL-R87-8, Flight Trans. Lab. Mass. Inst. of Technology May 1987.

P. P. Belobaba, "Airline yield management, an overview of seat inventory control," 21 Transportation Science No. 2, May 1987 pp. 63-72.

E. L. Williamson, "Comparison of the optimization techniques for origin-destination seat inventory control", Tech. Rpt. FTL-R88-2, Flight Transportation Lab., Massachusetts Institute of Technology, Cambridge, Mass., May 1988.

E. L. Williamson, "Revenue Impacts of Seat Inventory Control," presented to the Third International Airline Yield Management Conference, London, England, Dec. 3, 1990.

VIRTUAL FARE METHODS FOR A COMPUTERIZED AIRLINE SEAT INVENTORY CONTROL SYSTEM

BACKGROUND OF THE INVENTION

1. Cross Reference To Related Applications

This application is a continuation-in-part of patent application Ser. No. 07/630,261 filed Dec. 19, 1990 by Scot W. Hornick et al. entitled "AIRLINE SEAT INVENTORY CONTROL METHOD AND APPARATUS FOR COMPUTERIZED AIRLINE RESERVATION SYSTEMS", which application is incorporated herein by reference.

2. Field Of The Invention

This invention relates generally to an airline reservation system. In particular, the present invention provides an airline seat inventory control system for computerized airline reservation systems.

3. Description Of Related Art

Strategic and operational planning for commercial airlines are highly complicated problems, especially since the industry has been deregulated. In order to cope with this complexity, computer-based decision support systems have been adopted to facilitate the planning of schedules, routes, aircraft and crew rotations and yield management. Yield (or revenue) management is one of the most important aspects of the operational plan for a commercial airline. Yield management can be separated into two distinct parts: pricing and seat inventory control. Pricing involves the establishment of fare classes and tariffs within those classes for each specific origin-destination market. Seat inventory control is the periodic adjustment of nested booking limits for the various fare classes so as to optimize the passenger mix and thereby maximize the generated revenue. In particular, the objective is to fly the aircraft as full as possible without allowing the earlier-booking, discount-fare passengers to displace the later-booking, full-fare passengers.

Recently, considerable research has been devoted to developing automated seat inventory control methods (For a survey, see the following publications, all of which are incorporated herein by reference: P. P. Belobaba, "Airline yield management, an overview of seat inventory control," Transportation Science, 21 (1987), no. 2, pp. 63-72; For a comparative evaluation see E. L. Williamson, "Comparison of the optimization techniques for origin-destination seat inventory control," Technical Report FTL-R88-2, Flight Transportation Laboratory, Massachusetts Institute of Technology, Cambridge, Mass., May 1988). However, the proposed methods all have serious limitations.

Some methods are leg-based and therefore do not produce booking limits that are optimal in a system-wide sense. For example, the "locally greedy" approach used by these methods may not recognize the additional revenue generated by long-haul (multi-leg-itinerary) passengers versus short-haul (single-leg-itinerary) passengers, or, on the other hand, they may have an uneconomical bias to long-haul passengers (see, e.g., the following publications, all of which are incorporated herein by reference: K. Littlewood, "Forecasting and control of passenger bookings," Proceedings of the 12th AGIFORS Symposium, 1972, pp. 95-117; A. V. Bhatia and S. C. Parekh, "Optimal allocation of seats by fare," Presentation to the AGIFORS Reservation Study Group, 1973; H. Richter, "The differential revenue method to determine optimal seat allotments by fare type," Proceedings of the 22nd AGIFORS Symposium, 1982, pp. 339-362; P. P. Belobaba, "Air travel demand and airline seat inventory management," Technical Report FTL-R87-8, Flight Transportation Laboratory, Massachusetts Institute of Technology, Cambridge, Mass., May 1987; P. P. Belobaba, "Application of a probabilistic decision model to airline seat inventory control:, Operations Research, 37 (1989), No. 2, pp. 183-197).

Other methods are network-based, but assume a deterministic demand model, i.e., they assume that demand for air travel in a particular market is known precisely without any uncertainty (see, e.g., the following publication, which is incorporated herein by reference: F. Glover, R. Glover, J. Lorenzo, and C. McMillan, "The passenger-mix problem in the scheduled airlines," Interfaces, 12 (1982), pp. 73-79). Such methods do not reserve enough seats to capture higher-than-average demand for the more expensive fare classes. Further, these methods use linear programming formulations with large numbers of variables (and concomitantly time-consuming solutions) to determine the booking limits for each fare class. Efforts to simultaneously achieve network-wide optimality and account for the probabilistic nature of demand have resulted in 0-1 integer programming formulations with an even larger number of variables (see, e.g., the following publication, which is incorporated herein by reference: R. D. Wollmer, "An airline reservation model for opening and closing fare classes," Unpublished Internal Report, McDonnell-Douglas Corporation, Long Beach, Calif., 1985). The large number of variables and the complexity of the solution methods make these approaches unsuitable for real-world problems.

SUMMARY OF THE INVENTION

To overcome the limitations in the prior art discussed above, and to overcome other limitations readily recognizable to those skilled in the art, the present invention discloses an airline reservation system wherein reservations are controlled using, in part, a seat inventory control system. The present invention provides an airline seat reservation system that produces optimal network-wide seat inventory controls while taking into account the probabilistic nature of demand. The present invention, based on a concept termed Network-Based Expected Marginal Seat Revenue (EMSR), does not require the large number of variables required by the other network-based approaches, and it incorporates a probabilistic demand model without resorting to computationally intractable integer programming.

In the present invention, a computer-based seat inventory control system uses iterative leg-based methods to control bookings in a flight network comprised of a plurality of itinerary/fare class combinations using a plurality of flight legs. When considering a particular flight leg, the total fare paid by a passenger using the leg is adjusted by taking into account an estimate of the displacement cost of the travel on the other legs of the itinerary to create a virtual fare. Expected marginal seat revenues (or more precisely, their current approximations) provide the displacement costs on the legs when computing virtual fares. Using these virtual fares, a leg-based optimization method is applied to the individual legs one-by-one to compute new approximations of the expected marginal seat revenues. This method is iterated until the expected marginal seat revenues converge to their network-optimal values.

BRIEF DESCRIPTION OF THE DRAWINGS

In the drawings, where like numerals refer to like elements throughout the several views.

DETAILED DESCRIPTION OF THE PREFERRED EMBODIMENT

In the following Detailed Description of the Preferred Embodiment, reference is made to the accompanying Drawings which form a part hereof, and in which is shown by way of illustration three embodiments in which the invention may be practiced. It is to be understood that other embodiments may be utilized, and changes may be made to both the that process and the structure without departing from the scope of the present invention.

The present invention is an airline seat reservation system wherein seat reservations are controlled using, in part, a seat inventory control system. The present invention provides optimal seat reservation control using network-wide booking controls while taking into account the probabilistic nature of demand. The seat reservation control, based on a concept termed Network-Based Expected Marginal Seat Revenue (EMSR), does not require the large number of variables required by the other network-based approaches, and it incorporates a probabilistic demand model without resorting to computationally intractable integer programming as compared in Table 1.

This Detailed Description is organized into eight sections. In the first section, entitled "An Airline Seat Reservation System", the basic components of an airline seat reservation system are described, illustrating how the seat inventory control system can be integrated into such a system. The seat inventory control system generates the information necessary to set booking limits for the airline seat reservation system.

In the second section, entitled "A Mathematical Formulation", the mathematical formulation of the unnested network-based seat inventory control problem as a constrained nonlinear optimization problem is described. The optimum is characterized by a relatively small system of nonlinear equations.

In the third section, entitled "Solving The System With Virtual Fares And A Leg-Based Method," it is described how the system of equations characterizing the unnested network optimum can be solved by iterating a leg-based method and using EMSR-dependent virtual fares.

In the fourth section, entitled "Incorporating Nesting In The Optimization Model," the uses of nested availability in the optimization model are described.

In the fifth through eighth sections, the implementation of three embodiments of the airline seat inventory control is described.

I. An Airline Seat Reservation System

Figure 1:
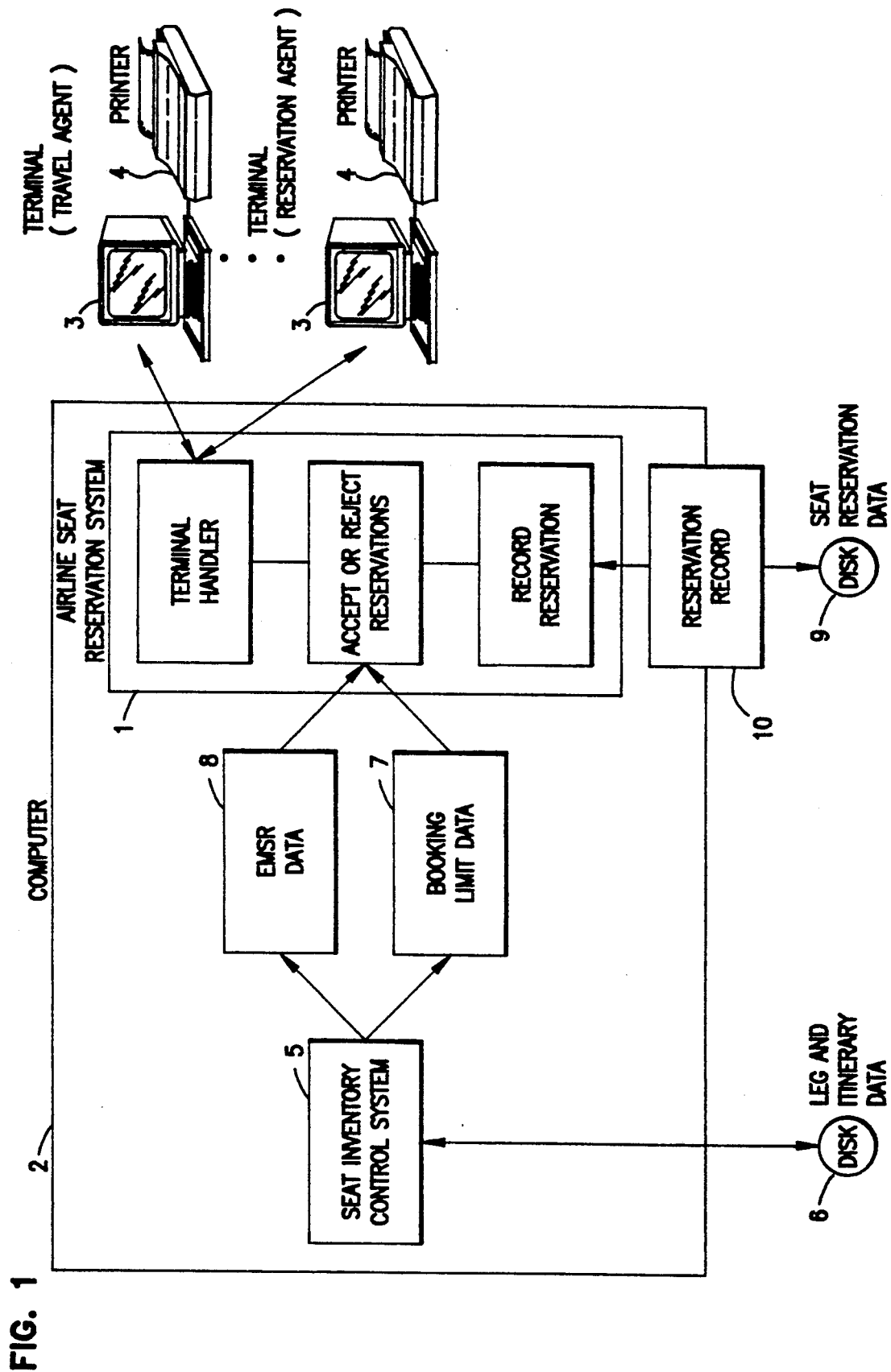
FIG. 1 is a block diagram describing the components of an integrated operation and strategic planning system using the inventory control method and apparatus of the present invention.

FIG. 1 describes the elements of an airline seat reservation system 1 according to the present invention. The reservation system 1 is a software system that is executed by a computer 2. The reservation system 1 communicates with a plurality of remote terminals 3 and printers 4. The reservation system 1 accepts or rejects seat reservation requests and records those reservations 10 in a database 9. In the present invention, a seat inventory control software system 5 uses a flight network database 6 to generate seat booking limits 7 and/or expected marginal seat revenues (EMSRs) 8 for input to the reservation system 1. The reservation system 1 relies on this data 7 and 8 to determine whether to accept or reject seat reservation requests.

The database 6 describes a flight network comprising a plurality of flight legs a, and itinerary p and fare class i combinations. Each flight leg a has a residual seating capacity $C_a$, and each itinerary p and fare class i combination has a revenue yield $f_p^i$ for a seat reserved therein.

Using an unnested EMSR-prorated virtual fare method of allocating seats in a computerized airline reservation system, the system calculates an initial expected marginal seat revenue (EMSR) $\lambda_a$ 8 for all flight legs a. An unnested EMSR-prorated virtual fare $v_{p,a}^i$ is computed for every itinerary p and fare class i combination that contains a particular flight leg a having a nonzero residual seating capacity $C_a$ so that:

$$v_{p,a}^j \stackrel{\Delta}{=} \frac{f_p^i \lambda_a}{\sum_{b \in p} \lambda_b}$$

A new EMSR $\lambda_a$ 8 for the particular flight leg a is calculated based on the virtual fares $v_{p,a}^i$ by applying Newton's method to a seating capacity constraint for the particular flight leg a:

$$\sum_{\substack{p \\ a \in p \, v_{p,a}^i > \lambda_a}} \sum_i Q_p^i (\lambda_a / v_{p,a}^j) = C_a$$

thereby ensuring that a total number of seats assigned to the itinerary p and fare class i combinations are equal to the residual seating capacity of the particular flight leg a, wherein the virtual fares $v_{p,a}^i$ are updated at each step of the Newton's method since each step changes the EMSR $\lambda_a$ for the particular flight leg a. The above steps are repeated for the particular flight leg a until the EMSR $\lambda_a$ 8 converges. The above steps are repeated for all flight legs a until the changes in EMSR's $\lambda_a$'s therefor are insignificant.

Using a nested EMSR-prorated virtual fare method of allocating seats in a computerized airline seat inventory control system, the system calculates an initial expected marginal seat revenue (EMSR) $\lambda_a$ 8 for all the flight legs a. A nested EMSR-prorated virtual fare $v_{p,a}^i$ is computed for each itinerary p and fare class i combination that contains a particular flight leg a having a nonzero residual seating capacity $C_a$ so that:

$$v_{p,a}^j \stackrel{\Delta}{=} \frac{f_p^i \lambda_a}{\sum_{b \in p} \lambda_b}$$

The itinerary p and fare class i combinations are sorted into a list ordered by descending values of virtual fares $v_{p,a}^i$. The sorted list of virtual fares $v_{p,a}^i$ is processed one-by-one to find an intersection point defining a new EMSR $\lambda_a$ 8 for the particular flight leg a between functions:

$$\lambda_a = x$$

$$\lambda_a = \sum_{f_d^j \geq x} f_d^j (\pi_j - \pi_{j-1})$$

wherein x is an independent variable, $f_d^j$ is a jth largest virtual fare on leg a, and $\pi_j$ is a probability that more than $C_a$ passengers are willing to pay $f_d^j$ or more to travel on leg a. The above steps are repeated for the particular flight leg a until the EMSR $\lambda_a$ 8 converges. The above steps are repeated for all flight legs a until the changes in EMSR's $\lambda_a$'s therefor are insignificant.

Using a nested EMSR-differential virtual fare method of allocating seats in a computerized airline seat inventory control system, the system calculates an initial expected marginal seat revenue (EMSR) $\lambda_a$ 8 for all the flight legs a. A nested EMSR-differential virtual fare $v_{p,a}^i$ is computed for each itinerary p and fare class i combination that contains a particular flight leg a having a nonzero residual seating capacity $C_a$ so that:

$$v_{p,a}^j \stackrel{\Delta}{=} f_p^i - \sum_{\substack{b \in p \\ b \neq a}} \lambda_b$$

The itinerary p and fare class i combinations are sorted into a list ordered by descending virtual fares $v_{p,a}^i$. The sorted list of virtual fares $v_{p,a}^i$ is processed one-by-one to find an intersection point defining a new EMSR $\lambda_a$ 8 for the particular flight leg a between functions:

$$\lambda_a = x$$

$$\lambda_a = \sum_{f_d^j \geq x} f_d^j (\pi_j - \pi_{j-1})$$

wherein x is an independent variable, $f_d^j$ is a jth largest virtual fare on leg a, and $\pi_j$ is a probability that more than $C_a$ passengers are willing to pay the virtual fare $f_d^j$ or more to travel on leg a. The above steps are repeated for all flight legs a until changes in EMSR's $\lambda_a$'s 8 therefor are insignificant.

Operators at the reservation terminals 3 enter a seat reservation request for a particular itinerary/fare class. The computer 2 receives the seat reservation request from the reservation terminals 3 and the airline reservation system 1 accepts or rejects the seat reservation request.

Two different paradigms may be used for determining availability, i.e., allocation-based availability and value-based availability. In allocation-based availability, bookings are compared to a booking limit or authorization level, so that the seat reservation request is accepted when the total number of seats 7 assigned to the itinerary p and fare class i combinations is not exceeded. In value-based availability, the generated revenue is compared to a sum of expected marginal seat revenues, so that the seat reservation request is accepted when the seat reservation request would yield revenue greater than or equal to a sum of the EMSR's $\lambda_a$'s 8 for all flight legs a in the itinerary p.

A electronic status message indicating acceptance or rejection of the seat reservation request is transmitted by the airline seat reservation system 1 to the reservation terminal 3. If accepted, the seat reservation request is recorded in the database 9 and a ticket may be printed on the printer 4 attached to the terminal 3.

II. A Mathematical Formulation

1. Deriving the Network Equations

The network-based seat inventory control problem can be formulated on a directed graph $D=(V,A)$, where the set of vertices V represents the set of cities and the set of arcs A represents the set of flight legs. If the seat inventory control system is controlling bookings for a particular day, then A represents the set of all flight legs occurring on that day, and it may include more than one flight leg between some city pairs. A path or itinerary p has a sequence of connecting flight legs in the graph D with an origin city $s(p)$ and a destination city $t(p)$. If leg a is included in itinerary p, then $a\epsilon p$. In this context, only itineraries satisfying minimum connection times constraints and having non-negligible traffic demand will be considered. The set of all such itineraries is denoted by P, and for each $p\epsilon P$, $f^i_p$ is established, which is the nominal revenue yield or tariff from fare class i for itinerary p travel from city $s(p)$ to city $t(p)$. Booking limits $S^i_p$ must be set for fare class i on itinerary p so as to maximize total system revenue, subject to the constraint that the total number of seats authorized for sale on each flight leg a is exactly equal to the capacity of that leg $C_a$, i.e., the number of seats on the aircraft flying the leg (overbooking is considered in the parent patent application incorporated herein by reference). As a matter of notation, the superscript i is dropped whenever a total over all fare classes is taken, and hence:

$$S_p \overset{\Delta}{=} \sum_{i=1}^{\phi} S_p^i$$

where $\Phi$ is the number of fare classes or tariff code buckets.

Since demand is stochastic, the total system revenue is actually a random variable, and so the objective of the present invention is to maximize its expected value R, which is just the sum of the expected revenue for all itinerary/fare class combinations. Writing this as an equation gives:

$$R = \sum_{p \epsilon P} \sum_{i=1}^{\phi} R_p^i (S_p^i) \qquad (1)$$

The capacity constraint for leg a can be written as:

$$\sum_{\substack{p\epsilon P \\ a\epsilon p}} S_p = C_a, \text{ for all } a\epsilon A \qquad (2)$$

In the parent patent application Ser. No. 07/630,261 filed Dec. 19, 1990 by Scot W. Hornick et al. entitled "AIRLINE SEAT INVENTORY CONTROL METHOD AND APPARATUS FOR COMPUTERIZED AIRLINE RESERVATION SYSTEMS", incorporated herein by reference, it was shown that the solution to this constrained optimization problem is characterized by the system of equations:

$$\sum_{\substack{p\epsilon P \\ a\epsilon p}} \sum_{i=1}^{\phi} Q_p^i \left( \sum_{b\epsilon p} \lambda_b/f_p^i \right) = C_a, \text{ for all } a\epsilon A \qquad (3)$$

wherein $\lambda_b$ is the expected marginal seat revenue (EMSR) for leg b and $Q^i_p(.)$ is the inverse of the cumulative probability density function of demand for fare class i travel on itinerary p.

III. Solving The System With Virtual Fares And A Leg-Based Method

The notion of using a leg-based method to control bookings and yet somehow accounting for the differences between long-haul and short-haul demand has given rise to virtual nesting methods (see, e.g., the following publication, which is incorporated herein by reference: P. P. Belobaba, "Air travel demand and airline seat inventory management," Technical Report FTL-R87-8, Flight Transportation Laboratory, Massachusetts Institute of Technology, Cambridge, Mass., May 1987). When considering a particular flight leg, these methods discount the total fare paid by a long-haul passenger using this leg by an estimate of the displacement cost of his travel on the other legs of his itinerary. Using these discounted or virtual fares, virtual nesting methods aggregate itinerary/fare class combinations with similar virtual fares into virtual fare buckets, which are then controlled by a conventional leg-based method. Large virtual nesting tables must be maintained in order to map the numerous itinerary/fare class combinations into different virtual fare buckets on each leg.

An important aspect of the present invention is the observation that it is unnecessary to use estimates of the displacement cost on the legs when computing virtual fares; the EMSR's themselves are the displacement costs. Hence, the virtual fare for travel on leg a along itinerary p at fare class i is:

$$v_{p,a}^i \overset{\Delta}{=} f_p^i - \sum_{\substack{b\epsilon p \\ b\neq a}} \lambda_b \qquad (4)$$

This is termed an EMSR-differential virtual fare since it is computed by taking the difference between the total fare 15 and the EMSR's on the other legs. A leg-based method that uses EMSR-differential virtual fares must be iterative since, as it recomputes the EMSR's, it also changes the virtual fares upon which they were based.

As was indicated, an iterated leg-based method using virtual fares can be used to solve Eq. (3). However, the EMSR-differential virtual fares of Eq. (4) will not ensure this equivalence. In the unnested network-based method of the parent patent application Ser. No. 07/630,261 filed Dec. 19, 1990 by Scot W. Hornick et al. entitled "AIRLINE SEAT INVENTORY CONTROL METHOD AND APPARATUS FOR COMPUTERIZED AIRLINE RESERVATION SYSTEMS", incorporated herein by reference, the number of seats allocated to itinerary p fare class i is:

$$S_p^i = Q_p^i \left( \sum_{b\epsilon p} \lambda_b/f_p^i \right) \qquad (5)$$

Let $S^i_{p,a}$ be the number of seats assigned to itinerary p fare class i travel on leg a by a leg-based method using virtual fares $v^i_{p,a}$. The formula for $S^i_{p,a}$ (using a distinct allocation method) is:

$$S^i_{p,a} = Q^i_p (\lambda_a/v^i_{p,a}) \qquad (6)$$

Equating Eqs. (5) and (6), it can be shown that equivalence is achieved when:

$$\lambda_a / V_{p,a}^i = \sum_{b \in p} \lambda_b / f_p^i \quad (7)$$

or $$v_{p,a}^i = \frac{f_p^i \lambda_a}{\sum_{b \in p} \lambda_b}$$

Figure 2:
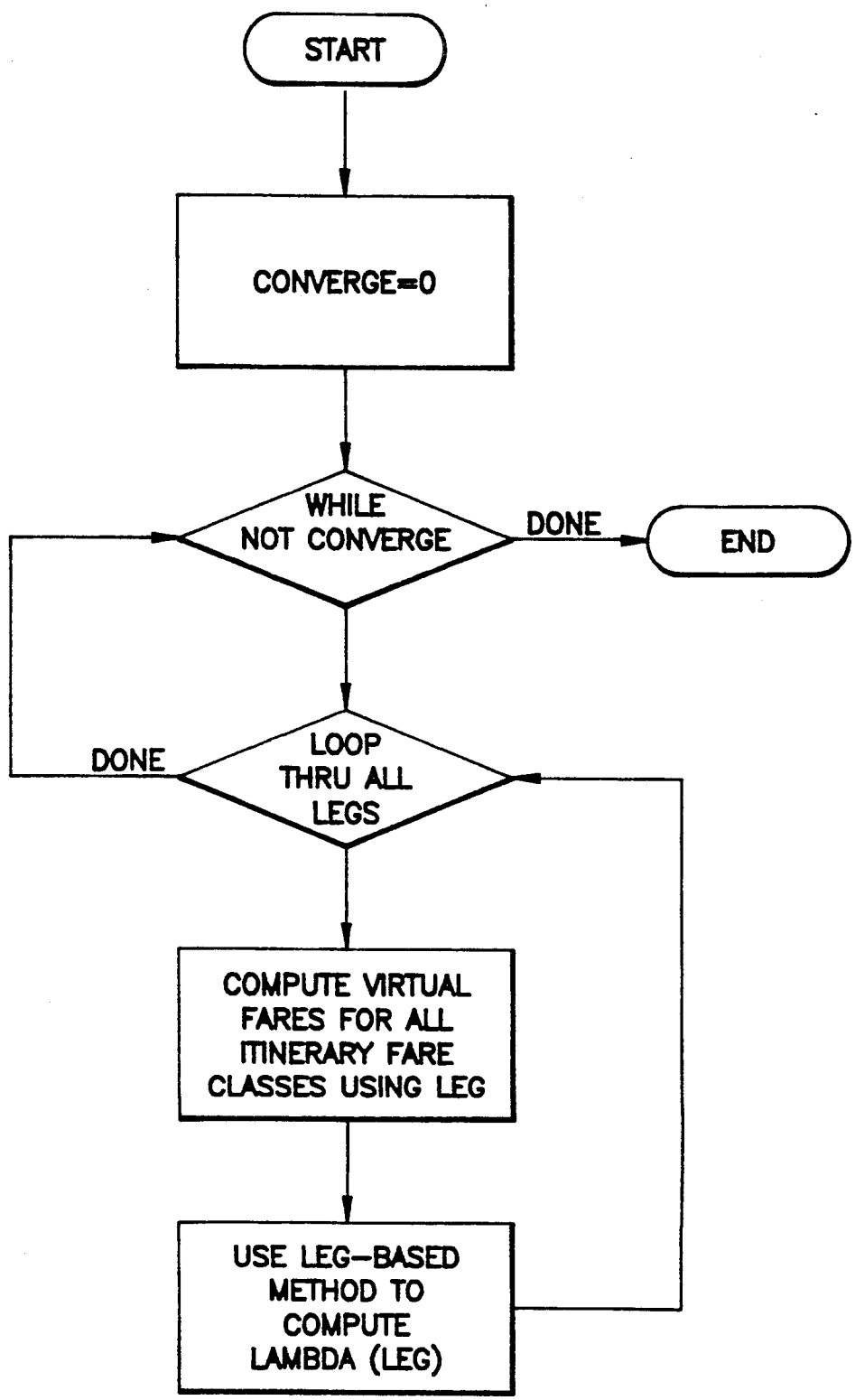
FIG. 2 is a flow chart describing the logic of an iterated leg-based method.

This is termed an EMSR-prorated virtual fare. FIG. 2 is a flow chart illustrating that when an iterated leg-based method using EMSR-prorated virtual fares converges, the seat allocations and EMSRs coincide with the optimal network-based solution, i.e., the solution of the system in Eq. (3).

IV. Incorporating Nesting In The Optimization Model

In a previous section, a nested availability rule based on the sum of the EMSRs along a passenger itinerary was discussed. On the other hand, all of the optimization models discussed so far are based on, or internally maintain, separate and distinct seat inventories for each itinerary/fare class combination. While these two ideas are apparently contradictory, an unnested optimization model can be used quite effectively with a nested availability rule. Nevertheless, some additional benefit can be derived from incorporating nesting into the optimization model as well.

This can be done by developing a nested leg-based optimization method and applying it to the EMSR-prorated virtual fare technique to obtain network-optimal results. Consider a leg a with virtual fares:

$$F_a^1 \geq f_a^2 \geq \ldots \geq f_a^m$$

Let $E_i$ denote the event that the demand for virtual fares $f_a^i$ and above exceeds the capacity $C_a$, i.e., $E_i$ occurs if more than $C_a$ passengers are willing to pay $f_a^i$ or more to travel on leg a. $P(E_i) = \pi_i$ is the probability of an occurrence of event $E_i$. Given that a seat will not be sold to a passenger who is unwilling to pay at least $\lambda_a$ (viewing $\lambda_a$ as a control parameter for the moment), the expected incremental value of a seat on the leg is:

$$\sum_{f_a^i \geq \lambda_a} f_a^i P(E_i \cap E_{i-1})$$

where $E_0 = \emptyset$ and "—" denotes complementation. However, this is just the EMSR. Thus, the correct value of $\lambda_a$ must satisfy:

$$\lambda_a = \sum_{f_a^i \geq \lambda_a} f_a^i P(E_i \cap E_{i-1})$$

Noting that $E_{i-1} \subseteq E_i$ by definition, this can be rewritten as:

$$\lambda_a = \sum_{f_a^i \geq \lambda_a} f_a^i (\pi_i - \pi_{i-1})$$

Solving this equation can be thought of as finding the intersection of the graphs of two functions of an independent variable x:

$$\lambda_a = x \quad (8)$$

$$\lambda_a = \sum_{f_a^i \geq x} f_a^i (\pi_i - \pi_{i-1})$$

Figure 3:
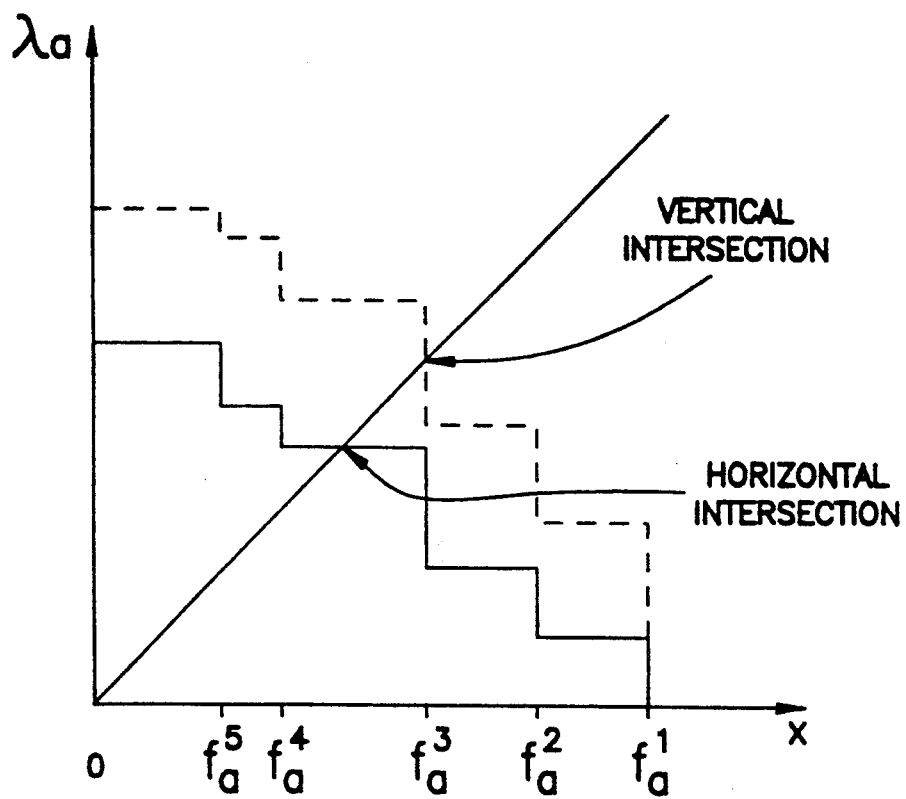
FIG. 3 is an illustration of two cases for the solution of Equation (8) infra.

The first of these functions is simply a straight line through the origin with slope one. The second function is nonincreasing with x. Initially, when x is zero, all virtual fares are admitted, and all possible terms appear in the summation; then, as x increases, terms drop out as their corresponding virtual fares are exceeded by x. This gives rise to a descending staircase behavior as shown in FIG. 3. Two different cases can occur for the intersection point: either it lies on a horizontal portion of the staircase or it lies on a vertical portion of the staircase.

The intersection point is found by proceeding up the staircase from right to left. As the staircase progress to subsequent virtual fares, first a check is made for a horizontal intersection with the diagonal line, and then the next term is added, checking for a vertical intersection (see FIG. 4). In the case of a vertical intersection, the lowest included virtual fare class is said to be marginal and the EMSR is said to be fixed to the virtual fare. It is almost certain that some of the demand from this marginal fare class will have to be rejected, and the EMSR of a fixed leg may have to be updated more frequently to prevent excessive booking of a marginal demand.

Figure 4:
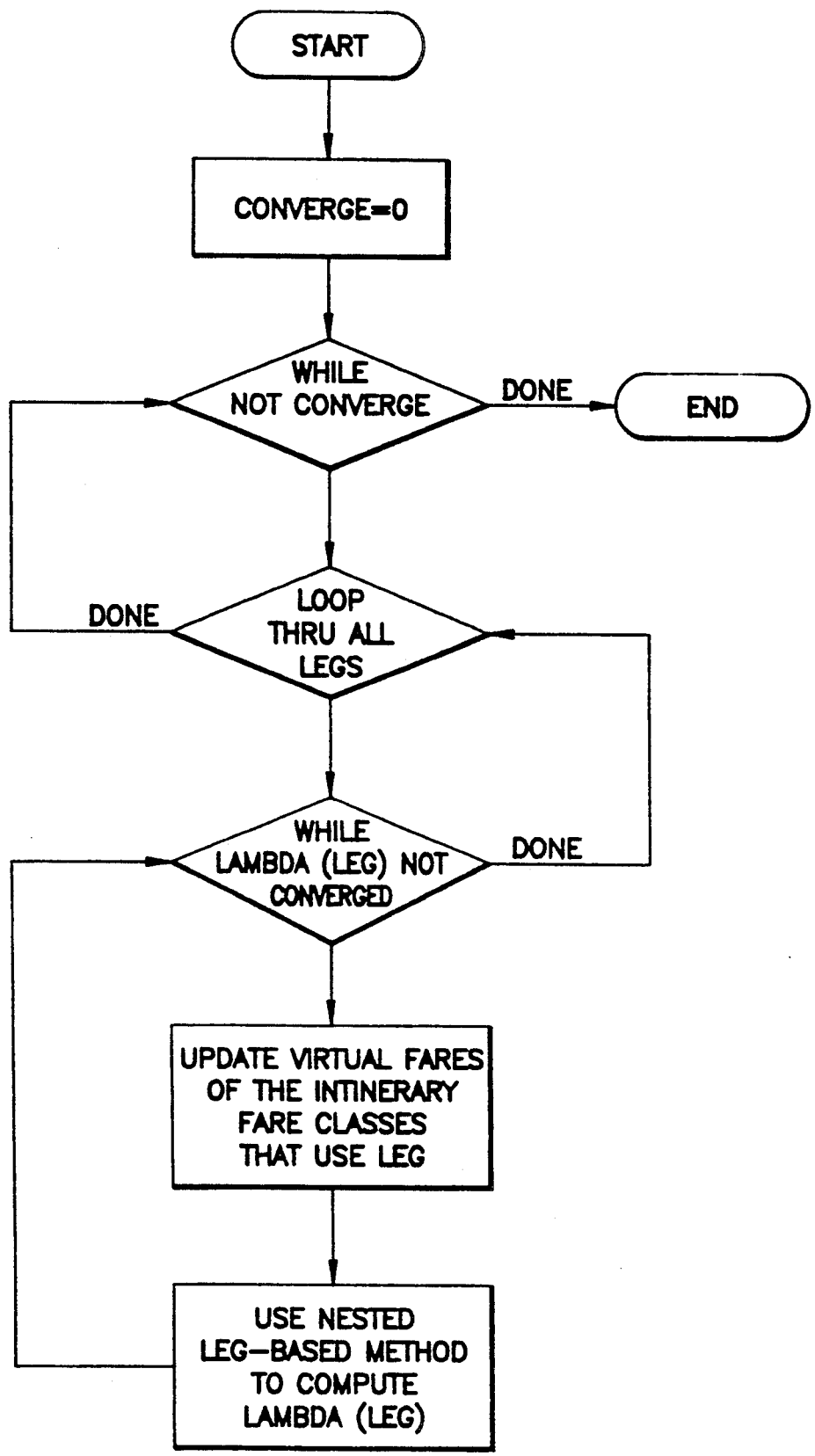
FIG. 4 is a flow chart describing the logic of an iterated leg-based method for EMSR-prorated virtual fares.

As mentioned above, this nested leg-based method is extended to a network-based method through the mechanism of EMSR-prorated virtual fares. In the case of EMSR-differential virtual fares, the virtual fares on leg a do not change with a change in $\lambda_a$ alone. However, with EMSR-pro-rated virtual fares, changes in $\lambda_a$ do have an immediate impact on the virtual fares on leg a. Hence, the iterative structure of FIG. 2 must be modified to allow the effect of this change to be reflected as indicated in FIG. 4.

V. Implementation Of Common Initialization Routines

FIGS. 5-9 are flow charts describing the operation of common initialization routines in a computer program implementing each of the embodiments discussed infra.

The following symbols are used in the flow charts and the descriptions thereof:

1. LEG is an index to a leg of an itinerary or path.
2. ITIN is an itinerary (also termed "path").
3. ITIN-F is an itinerary/fare class combination.
4. LAMBDA(LEG) is the expected marginal seat revenue (EMSR) generated by increasing the capacity of the leg by 1 seat.
5. MEAN(ITIN-F) is the mean of the demand for the ITIN-F.
6. STDDEV(ITIN-F) is the standard deviation of the demand for the ITIN-F (i.e., STDDEV(ITIN-F)$^2$ is the variance of the demand for the ITIN-F).
7. FARE(ITIN-F) is the fare for an ITIN-F.
8. CAPACITY(LEG) is the seating capacity of the LEG.
9. CURRENT-BUCKETS is a list of ITIN-F's that use a LEG. Each ITIN-F containing the LEG is represented by a bucket element. In this manner, all ITIN-F's using the LEG can be tracked so that seats can be allocated among the ITIN-F s.

10. Each element of a bucket list contains the following variables:
   a. PATH-NUM is the path, i.e., ITIN, that gives rise to the bucket.
   b. FARE-IND is the fare class that gives rise to the bucket. Combined with the PATH-NUM this provides the ITIN-F.
   c. ELEMENT.MEAN is the mean of the demand for the LEG.
   d. ELEMENT.STDDEV is the standard deviation of the demand for the LEG.
   e. ELEMENT.TRUE-FARE is the true fare for the ITIN-F.
   f. ELEMENT.VIRT-FARE is the virtual fare for the ITIN-F.
   g. ELEMENT.LAMBDA-OFFSET is the maximum LAMBDA value, i.e., EMSR, for which the bucket gets seats.
   h. ELEMENT.LAMBDA-OTHER is the summation of the LAMBDA(LEG) values for the other LEGs on the ITIN.
   i. ELEMENT.SEATS is the number of seats allocated to the ITIN-F.
   j. ELEMENT.EXPCFRESQ is a bucket-specific intermediate value.
   k. ELEMENT.SQR2PISBF is a bucket-specific constant.

Figure 5:
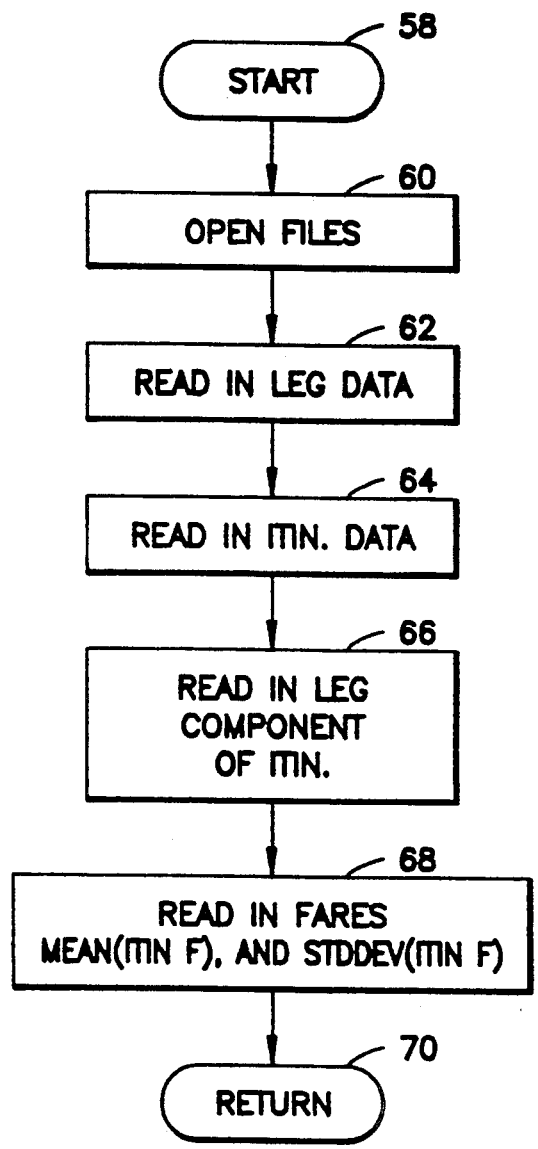
FIG. 5 is a flow chart describing the logic of the GET INPUT routine.

FIG. 5 is a flow chart describing the logic of the GET INPUT routine. The GET INPUT routine inputs data consisting of:
1. The names of the cities served by the airline.
2. The leg information:
   a. Flight information;
   b. Origin;
   c. Destination;
   d. Capacity of the carriers;
   e. Distance;
3. Itinerary Information:
   a. Flight number of the first leg;
   b. Origin;
   c. Destination;
   d. Number of stops;
   e. Flight number, origin and destination of each leg component;
   f. Fares for each fare class;
   g. The $\mu$(ITIN-F), i.e., mean, and $\sigma$(ITIN-F), i.e., standard deviation, of demand for each ITIN-F.

Because the present invention may be used with any number of airline reservation systems, the actual operation of the GET INPUT depends on the specific format of the input supplied by the airline reservation system.

Figure 6:
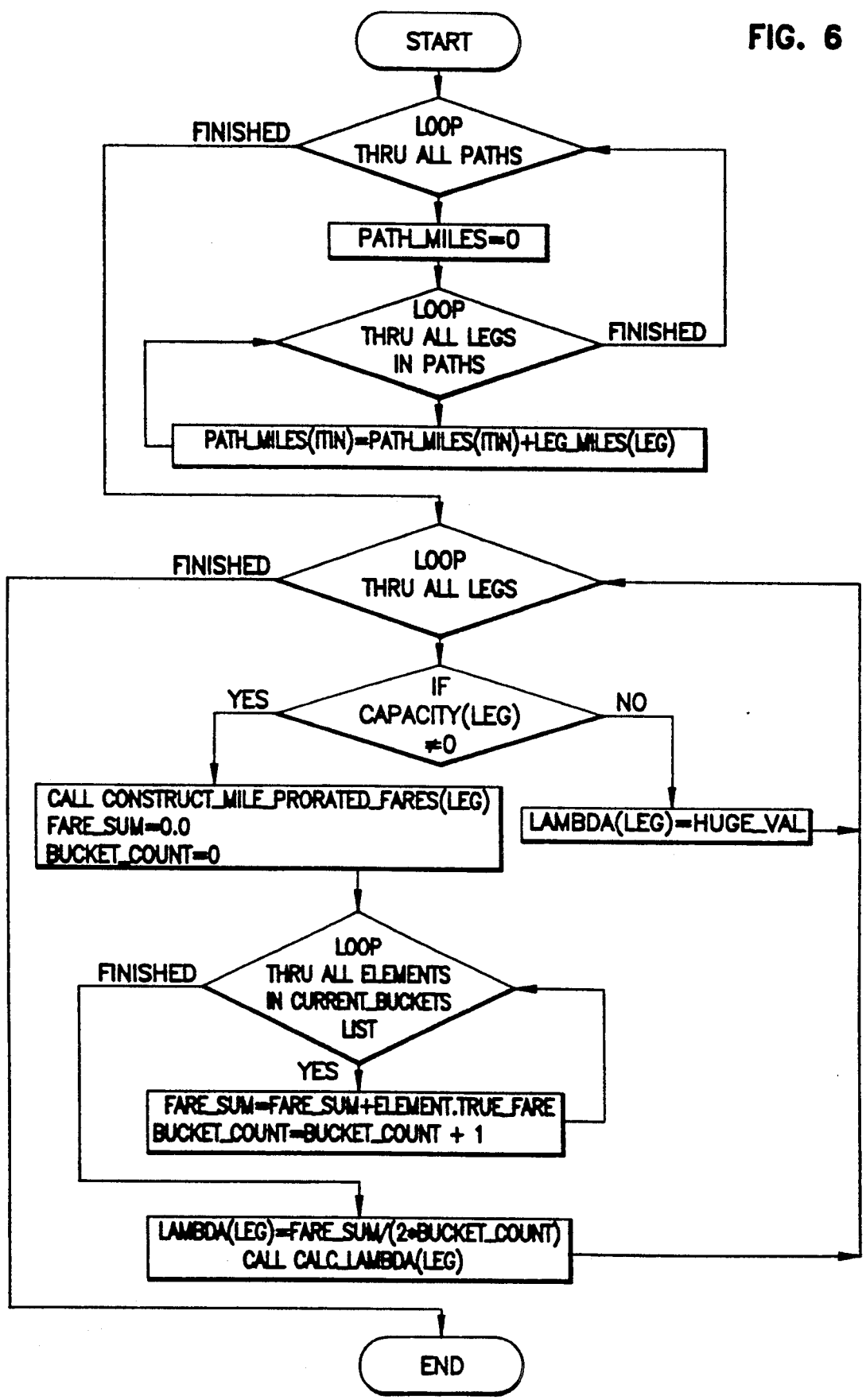
FIG. 6 is combined are a flow chart describing the logic of the INIT routine.

FIG. 6 is a flow chart describing the logic of the INIT (INITIALIZATION) routine in the present invention. The INIT routine initializes the global variables of the program, and calculates the starting LAMBDA (LEG) values using a leg-based mileage-prorated EMSR method.

After the INIT routine starts, a first loop is executed once for each path, i.e., itinerary or ITIN, in the network. The total mileage of each ITIN is calculated. The first loop then terminates and a second loop is executed once for each LEG in the network.

Figure 7:
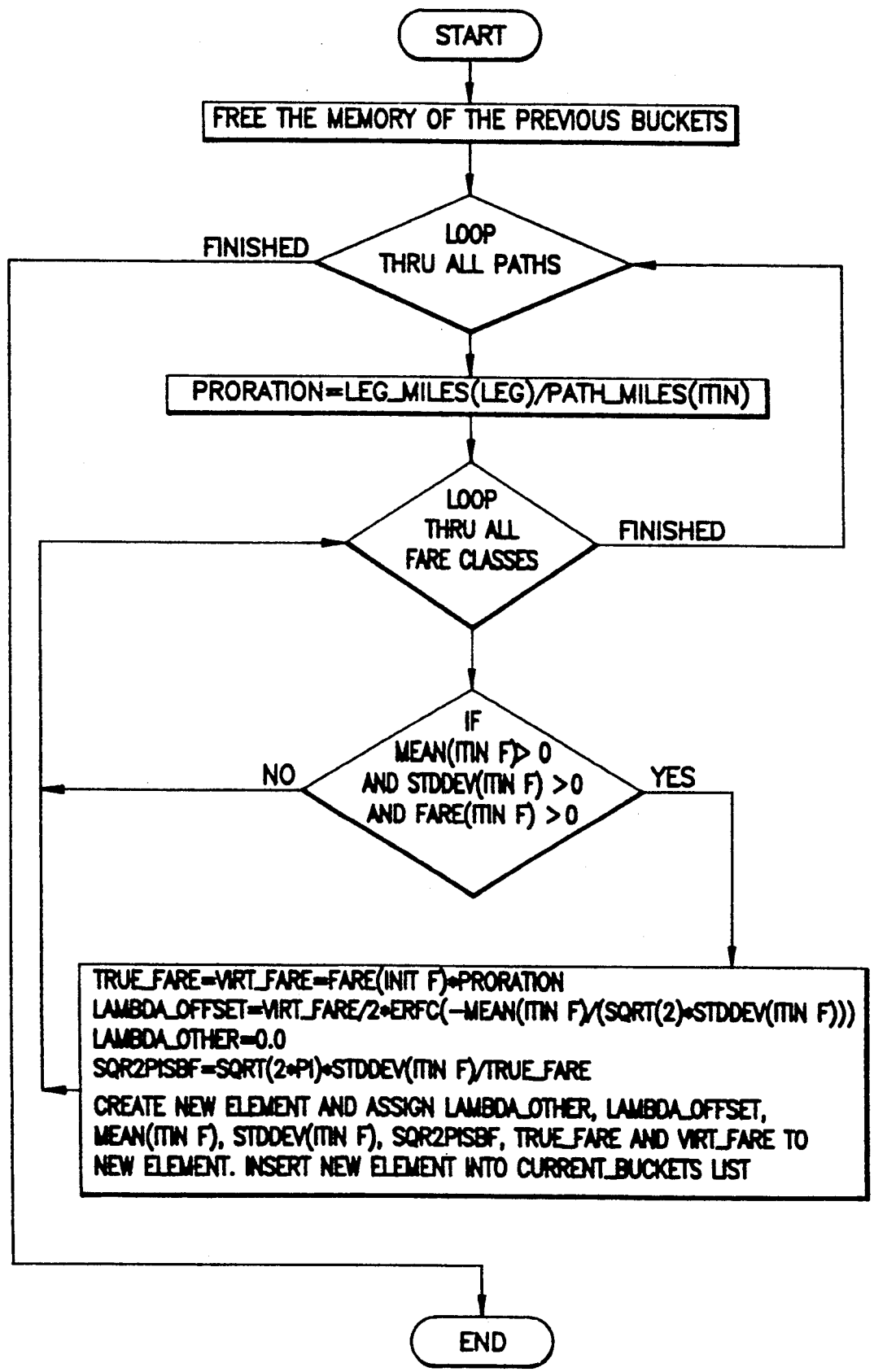
FIG. 7 is a flow chart describing the logic of the CONSTRUCT MILE PRORATED FARES routine in the unnested EMSR-prorated virtual fare method.
Figure 8:
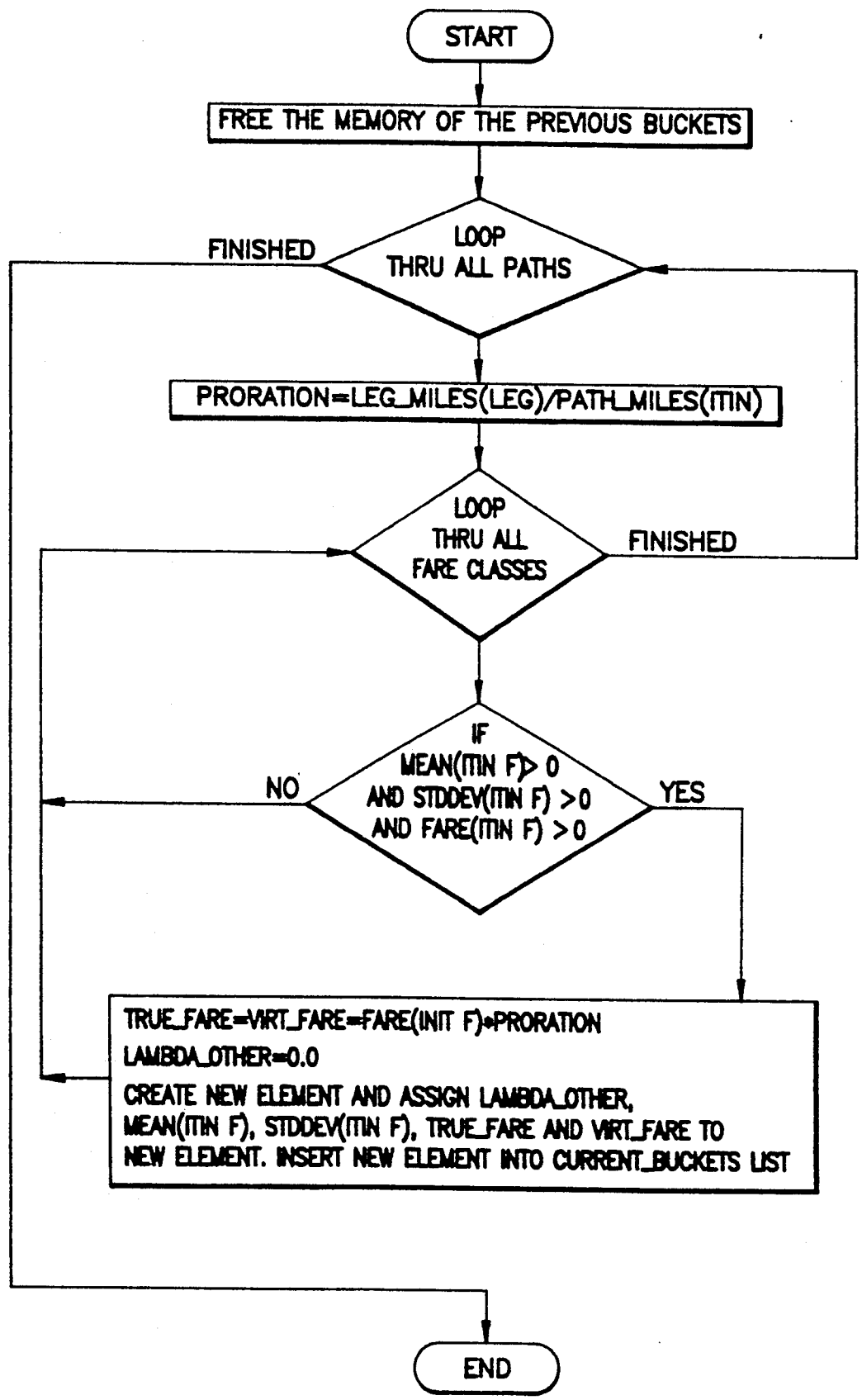
FIG. 8 is a flow chart describing the logic of the CONSTRUCT MILE PRORATED FARES routine in the nested EMSR-prorated virtual fare method.
Figure 9:
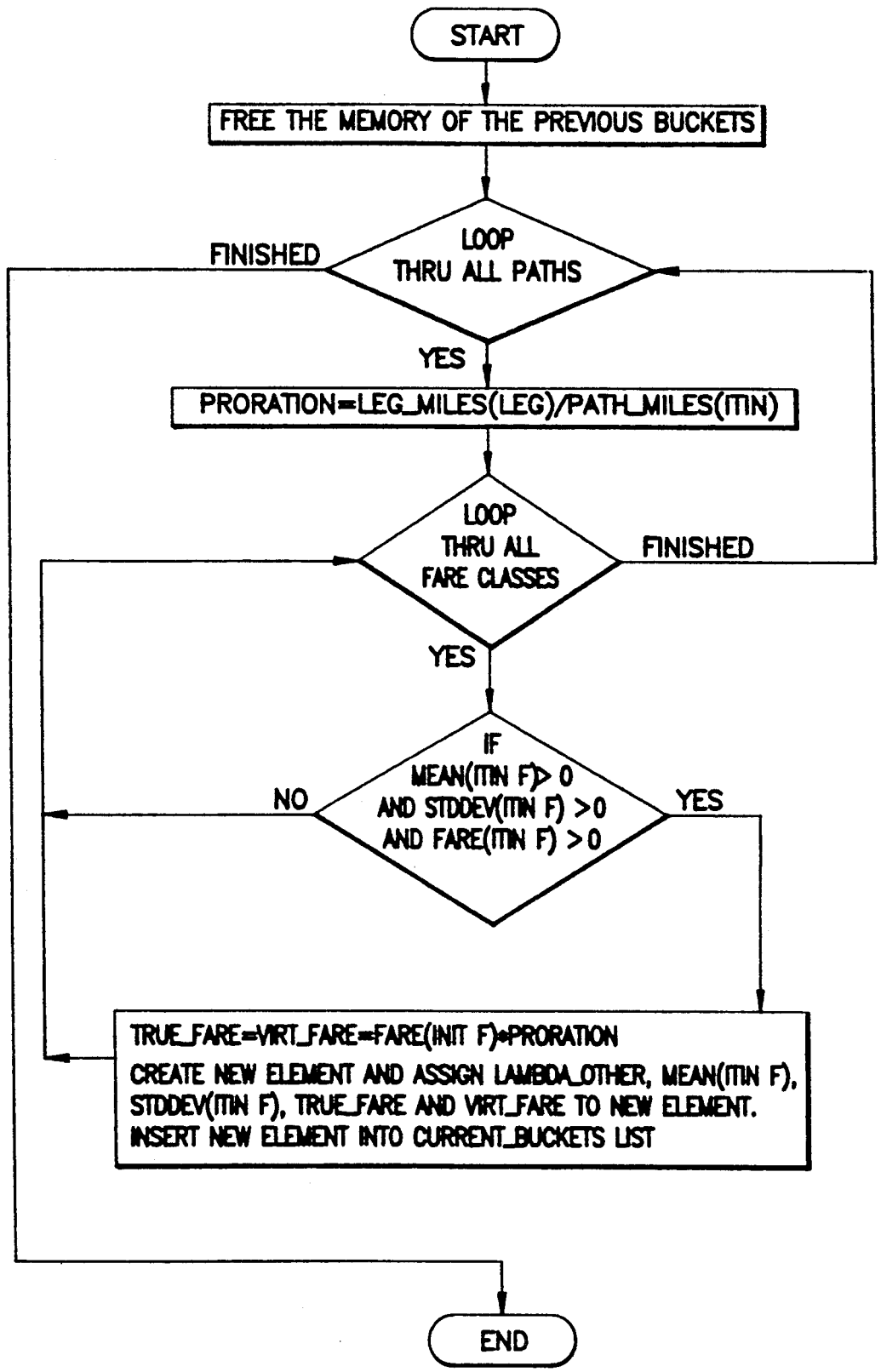
FIG. 9 is a flow chart describing the logic of the CONSTRUCT MILE PRORATED FARES routine in the nested EMSR-differential virtual fare method.

If CAPACITY(LEG) is nonzero, then a CONSTRUCT MILE PRORATED FARES routine is called for the LEG depending on the particular virtual fare method (the CONSTRUCT MILE PRORATED FARES routines differ in the details of the data structures each uses). FIG. 7 is a flow chart describing the logic of the CONSTRUCT MILE PRORATED FARES routine in the unnested EMSR-prorated virtual fare method. FIG. 8 is a flow chart describing the logic of the CONSTRUCT MILE PRORATED FARES routine in the nested EMSR-prorated virtual fare method. FIG. 9 is a flow chart describing the logic of the CONSTRUCT MILE PRORATED FARES routine in the nested EMSR-differential virtual fare method. The FARE-SUM and the BUCKET-COUNT is set to zero. A third loop is executed once for each element in the CURRENT-BUCKETS list. The ELEMENT.TRUE-FARE is summed in FARE-SUM and the BUCKET-COUNT is incremented by one. When the third loop terminates, the LAMBDA(LEG) is calculated by dividing the FARE-SUM by two times the BUCKET-COUNT.

If CAPACITY(LEG) is zero, then the LAMBDA(LEG) is set to a "huge value".

The second loop terminates and the INIT routine terminates.

FIG. 7 is a flow chart describing the logic of the CONSTRUCT MILE PRORATED FARES routine in the unnested EMSR-prorated virtual fare method. The CONSTRUCT MILE PRORATED FARES routine initializes mileage prorated virtual fares to provide suitable initial EMSR's.

The CONSTRUCT MILE PRORATED FARES routine has as its parameter the desired LEG in the network. After the routine starts, all previous buckets are de-allocated. A first loop is executed once for all paths, i.e., ITIN's, in the network containing the LEG. The PRORATION value is calculated by dividing the miles on the LEG by the miles for the ITIN. A second loop is executed for all fare classes in the ITIN. If MEAN(ITIN-F), STDDEV(ITIN-F), and FARE(ITIN-F) are all greater than zero, then LAMBDA-OFFSET is set to zero, TRUE-FARE and VIRT-FARE are set to the value of:

(FARE(ITIN-F))(PRORATION)

LAMBDA-OFFSET is set to the value of:
(VIRT-FARE)/2(erfc((−MEAN-(ITIN−F)/√2(STDDEV(ITIN−F))))

and SQR2PISBF is set the value of:
√2π(STDDEV(ITIN−F))/(TRUE−FARE)

A new element is created, LAMBDA-OTHER, LAMBDA-OFFSET, MEAN(ITIN-F), STDDEV(ITIN-F), SQR2PISBF, TRUE-FARE, and VIRT-FARE are assigned thereto, and the new element is inserted into the CURRENT-BUCKETS list. The second and first loops terminate, and the CONSTRUCT MILE PRORATED FARES routine terminates.

FIG. 8 is a flow chart describing the logic of the CONSTRUCT MILE PRORATED FARES routine in the nested EMSR-prorated virtual fare method. The CONSTRUCT MILE PRORATED FARES routine initializes mileage prorated virtual fares to provide suitable initial EMSR's.

The CONSTRUCT MILE PRORATED FARES routine has as its parameter the desired LEG in the network. After the routine starts, all previous buckets are de-allocated. A first loop is executed once for all paths, i.e., ITIN's, in the network containing the LEG.

The PRORATION value is calculated by dividing the miles on the LEG by the miles for the ITIN. A second loop is executed for all fare classes in the ITIN. If MEAN(ITIN-F), STDDEV(ITIN-F), and FARE(ITIN-F) are all greater than zero, then TRUE-FARE and VIRT-FARE are set to the value of:

(FARE(ITIN−F))(PRORATION)

A new element is created, LAMBDA-OFFSET, MEAN(ITIN-F), STDDEV(ITIN-F), TRUE-FARE, and VIRT-FARE are assigned thereto, and the new element is inserted into the CURRENT-BUCKETS list. The second and first loops terminate, and the CONSTRUCT MILE PRORATED FARES routine terminates.

FIG. 9 is a flow chart describing the logic of the CONSTRUCT MILE PRORATED FARES routine in the nested EMSR-differential virtual fare method. The CONSTRUCT MILE PRORATED FARES routine initializes mileage prorated virtual fares to provide suitable initial EMSR's.

The CONSTRUCT MILE PRORATED FARES routine has as its parameter the desired LEG in the network. After the routine starts, all previous buckets are de-allocated. A first loop is executed once for all paths, i.e., ITIN's, in the network containing the LEG. The PRORATION value is calculated by dividing the miles on the LEG by the miles for the ITIN. A second loop is executed for all fare classes in the ITIN. If MEAN(ITIN-F), STDDEV(ITIN-F), and FARE(ITIN-F) are all greater than zero, then TRUE-FARE and VIRT-FARE are set to the value of:

(FARE(ITIN−F))(PRORATION)

A new element is created, LAMBDA-OFFSET, MEAN(ITIN-F), STDDEV(ITIN-F), TRUE-FARE, and VIRT-FARE are assigned thereto, and the new element is inserted into the CURRENT-BUCKETS list. The second and first loops terminate, and the CONSTRUCT MILE PRORATED FARES routine terminates.

VI. Implementation Of Unnested EMSR-Prorated Virtual Fare

FIGS. 10-16 are flow charts describing the operation of a number of routines of a computer program implementing the Unnested EMSR-Prorated Virtual Fare Method. For each flight leg in the network which still has residual capacity (i.e., unsold seats), an EMSR-prorated virtual fare is computed for each itinerary/fare class that contains the leg using previously calculated EMSR's. Based on these virtual fares, the new EMSR for the leg is calculated by applying Newton's method to the capacity constraint equation for the leg (which ensures that the number of seats assigned to the various virtual fare classes on the leg is equal to the residual capacity of the flight). If NEWTON's method fails to converge, then a binary search is used. Since each step of Newton's method (or binary search) changes the EMSR of the current leg, the virtual fares must be updated at each step. Once Newton's method (or binary search) converges, then the next leg is processed. The loop terminates when a pass through all legs in the network results in no significant change (by more than a penny) in any EMSR.

The following symbols are used in the flow charts and the descriptions thereof:
1. LEG is an index to a leg of an itinerary or path.
2. ITIN is an itinerary (also termed "path").
3. ITIN-F is an itinerary/fare class combination.
4. LAMBDA(LEG) is the expected marginal seat revenue (EMSR) generated by increasing the capacity of the leg by 1 seat.
5. MEAN(ITIN-F) is the mean of the demand for the ITIN-F.
6. STDDEV(ITIN-F) is the standard deviation of the demand for the ITIN-F (i.e., STDDEV(ITIN-F)$^2$ is the variance of the demand for the ITIN-F).
7. FARE(ITIN-F) is the fare for an ITIN-F.
8. CAPACITY(LEG) is the mean of the demand for the ITIN-F.
9. DELTA is the change in the EMSR, i.e., the change in LAMBDA (LEG).
10. EPSILON is a tolerance value.
11. CURRENT-BUCKETS is a list of ITIN-F's that use a LEG. Each ITIN-F containing the LEG is represented by a bucket element. In this manner, all ITIN-F's using the LEG can be tracked so that seats can be allocated among the ITIN-F's.
11. FIXED-BUCKETS is a list of elements that have been "fixed", i.e., wherein the virtual fare is approximately equal to the LAMBDA(LEG) value.
12. Each element of a bucket list contains the following variables:
   a. PATH-NUM is the path, i.e., ITIN, that gives rise to the bucket.
   b. FARE-IND is the fare class that gives rise to the bucket. Combined with the PATH-NUM this provides the ITIN-F.
   c. ELEMENT.MEAN is the mean of the demand for the LEG.
   d. ELEMENT.STDDEV is the standard deviation of the demand for the LEG.
   e. ELEMENT.TRUE-FARE is the true fare for the ITIN-F.
   f. ELEMENT.VIRT-FARE is the virtual fare for the ITIN-F.
   g. ELEMENT.LAMBDA-OFFSET is the maximum LAMBDA value, i.e., EMSR, for which the bucket gets seats. This value is required for those demand models, e.g., the Gaussian demand model, that anomalously assign non-zero probability to negative demand. Demand models, e.g., the incomplete gamma distribution, that do not assign non-zero probability to negative demand will not use this value, e.g., ELEMENT.LAMBDA-OFFSET-=ELEMENT.VIRT-FARE.
   h. ELEMENT.LAMBDA-OTHER is the summation of the LAMBDA(LEG) values for the other LEGs on the ITIN.
   i. ELEMENT.SEATS is the number of seats allocated to the ITIN-F.
   j. ELEMENT.EXPCFRESQ is a bucket-specific intermediate value.
   k. ELEMENT.SQR2PISBF is a bucket-specific constant.

Figure 10:
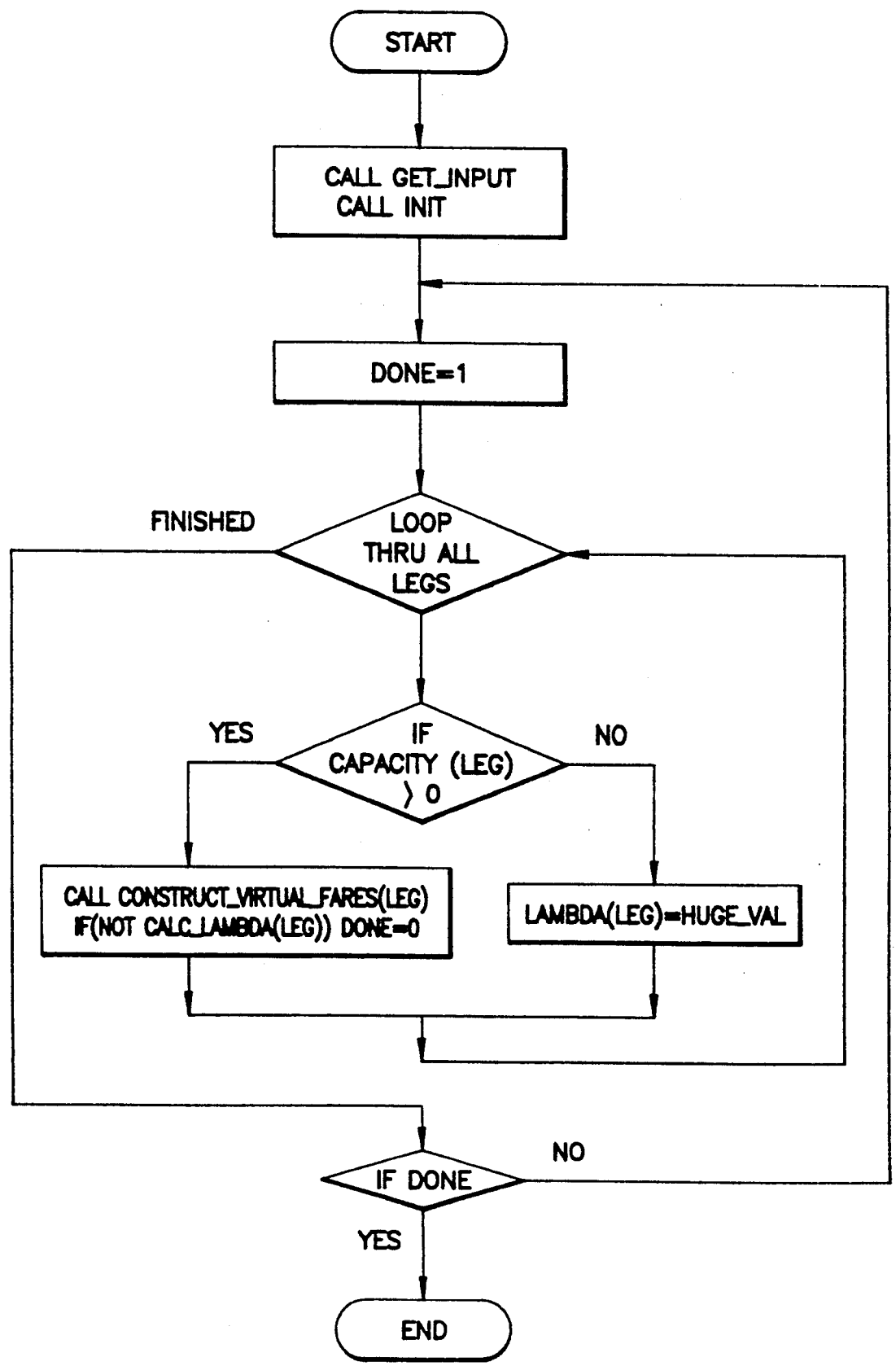
FIG. 10 is a flow chart describing the MAIN routine in the unnested EMSR-prorated virtual fare method.

FIG. 10 is a flow chart describing the MAIN routine in the Unnested EMSR-Prorated Virtual Fare Method. At the start of the MAIN routine, the GET INPUT and INIT routines of FIGS. 6 and 7 respectively are called. The variable DONE is set to the value 1. A first loop is performed for each leg in the network. If CAPACITY(-LEG) is greater than zero, then the CONSTRUCT VIRTUAL FARES routine is called for the leg. The CALC LAMBDA routine is called and if the return value therefrom is 0, then DONE is set to 0. If the CAPACITY(LEG) is zero, then LAMBDA (LEG) is set to a large initial value. When the first loop terminates, after examining each leg in the network, the DONE variable is examined. If DONE is 0, then the loop is performed again; otherwise, the MAIN routine terminates.

Figure 11A:
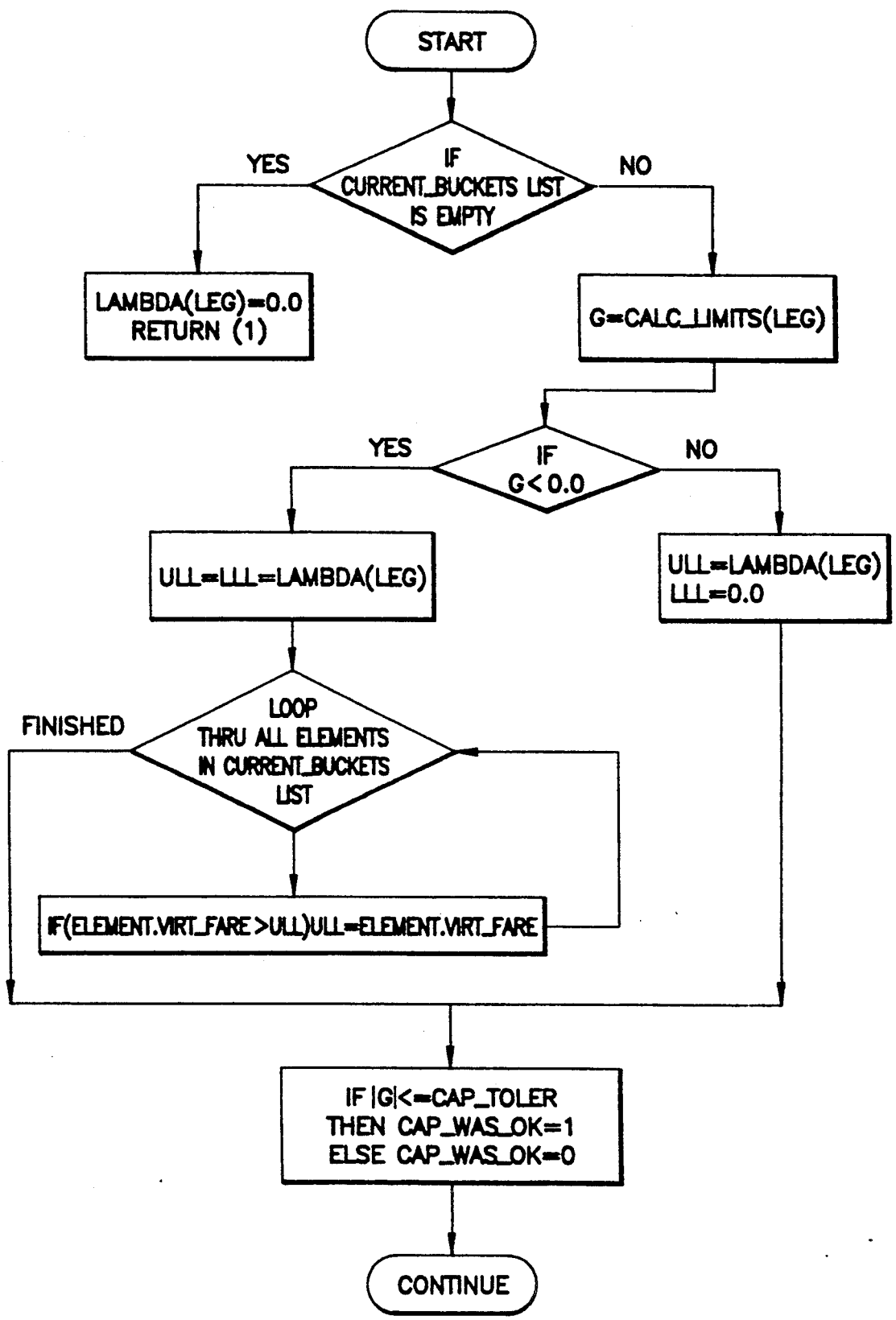
FIGS. 11A and 11B combined are a flow chart describing the CALC LAMBDA routine in the unnested EMSR-prorated virtual fare method.
Figure 11B:
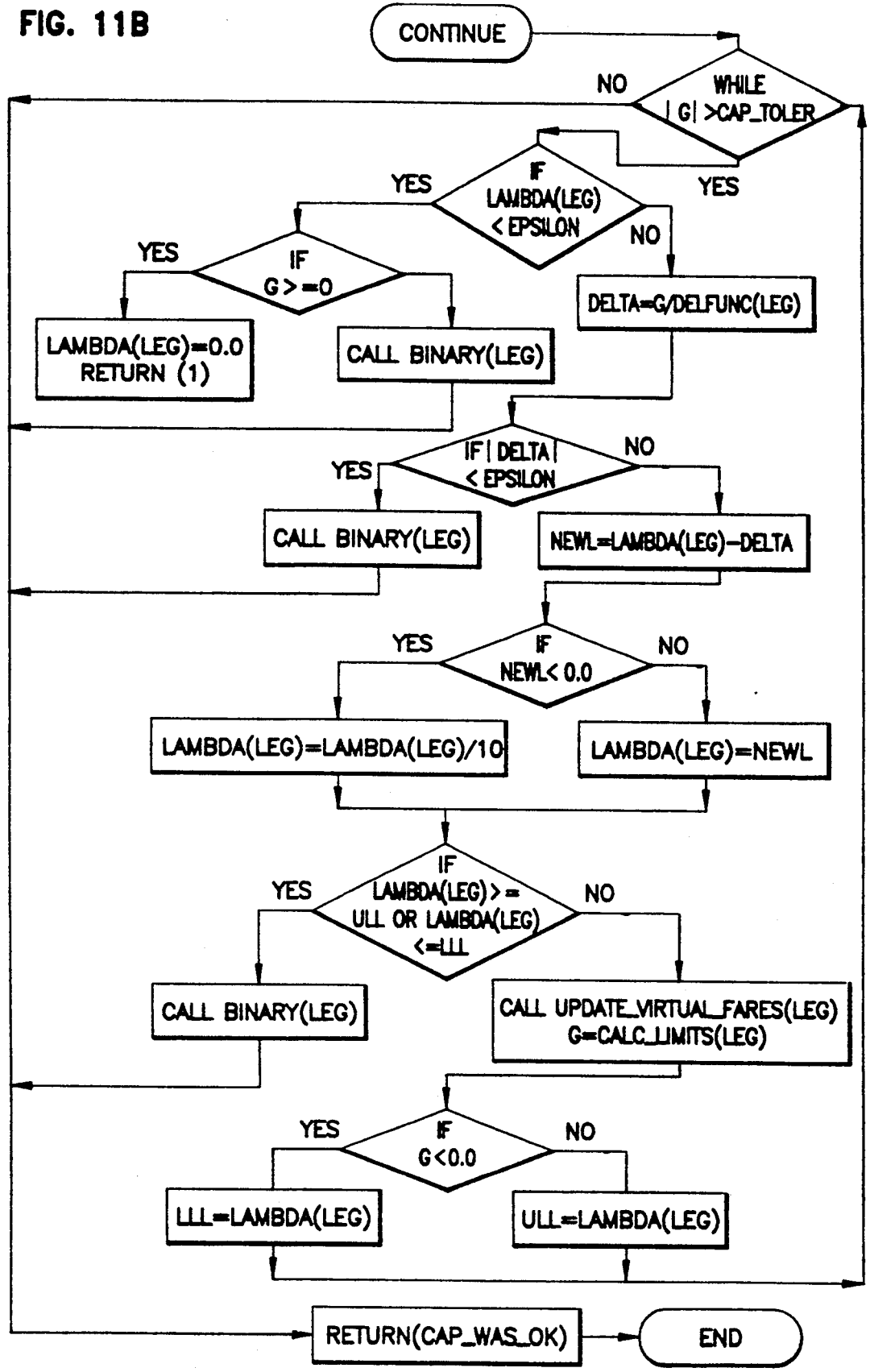

FIGS. 11A and 11B describe the CALC LAMBDA routine. The CALC LAMBDA routine is called with a LEG parameter and calculates the LAMBDA (LEG) value. If the CURRENT-BUCKETS list is empty, then the aggregated demand for the leg is far less than the residual capacity of the leg, so LAMBDA (LEG) is set to 0 and a true value is returned to the calling procedure. If the CURRENT-BUCKETS list has elements, then the CALC LIMITS routine is called to calculate the capacity slack, which is stored in the variable G. If G is positive or equal to 0, then the upper bound ULL is set to the value of LAMBDA(LEG) and the lower bound LLL is set to 0. If the variable G is negative, then ULL and LLL are both set to the LAMBDA (LEG) value. A first loop is performed for every element in the CURRENT-BUCKETS list. If ELEMENT.VIRT-FARE is greater than ULL, then ULL is set to the value of ELEMENT.VIRT-FARE. Thus, ULL is set to the maximum virtual fare. When the first loop terminates, if the absolute value of the capacity slack G is less than the value of CAP-TOLER, then the variable CAP-WAS-OK is set to true, otherwise it is set to false, and the routine terminates.

Figure 12A:
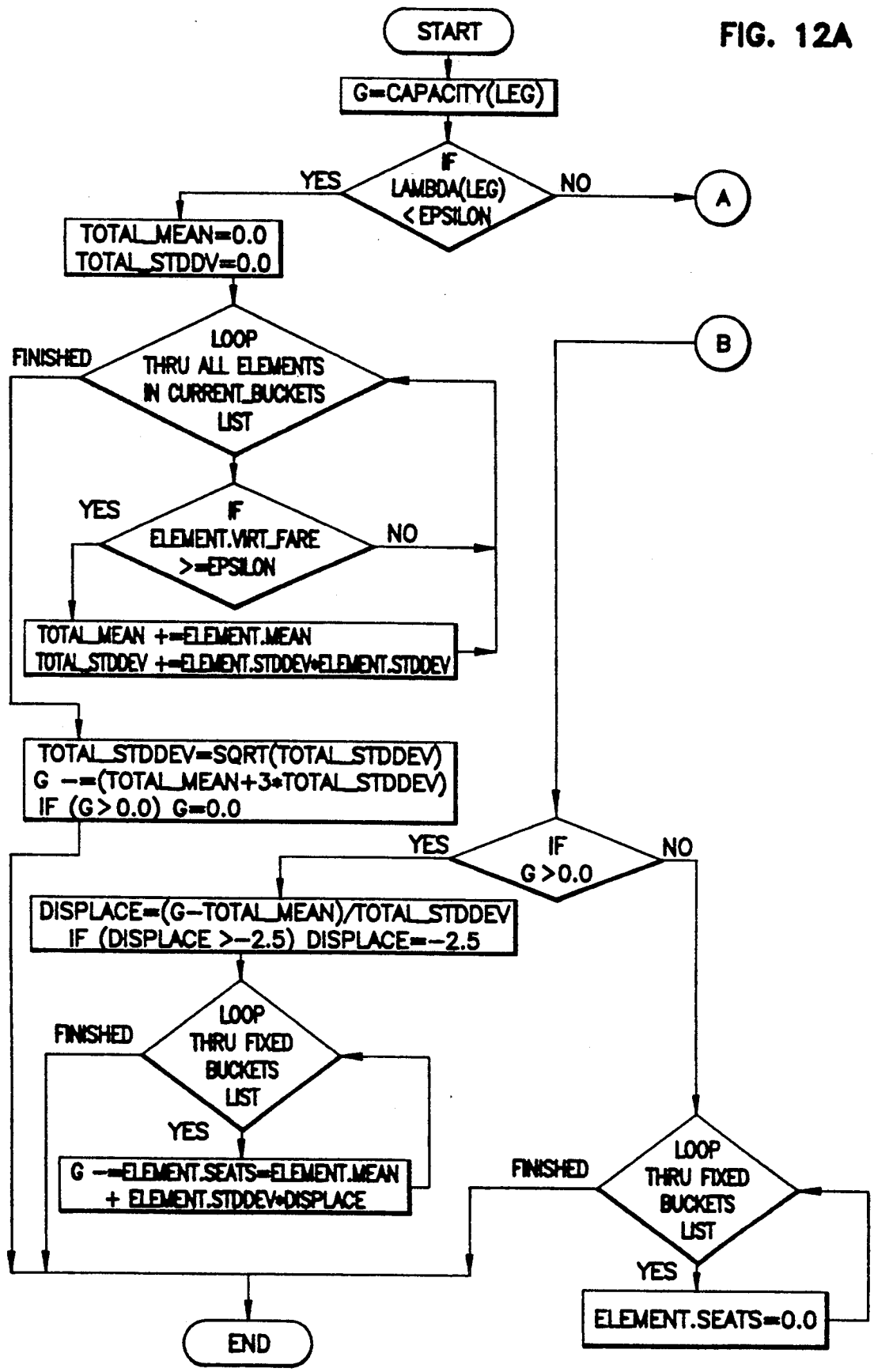
FIGS. 12A and 12B combined are a flow chart describing the CALC LIMITS routine in the unnested EMSR-prorated virtual fare method.
Figure 12B:
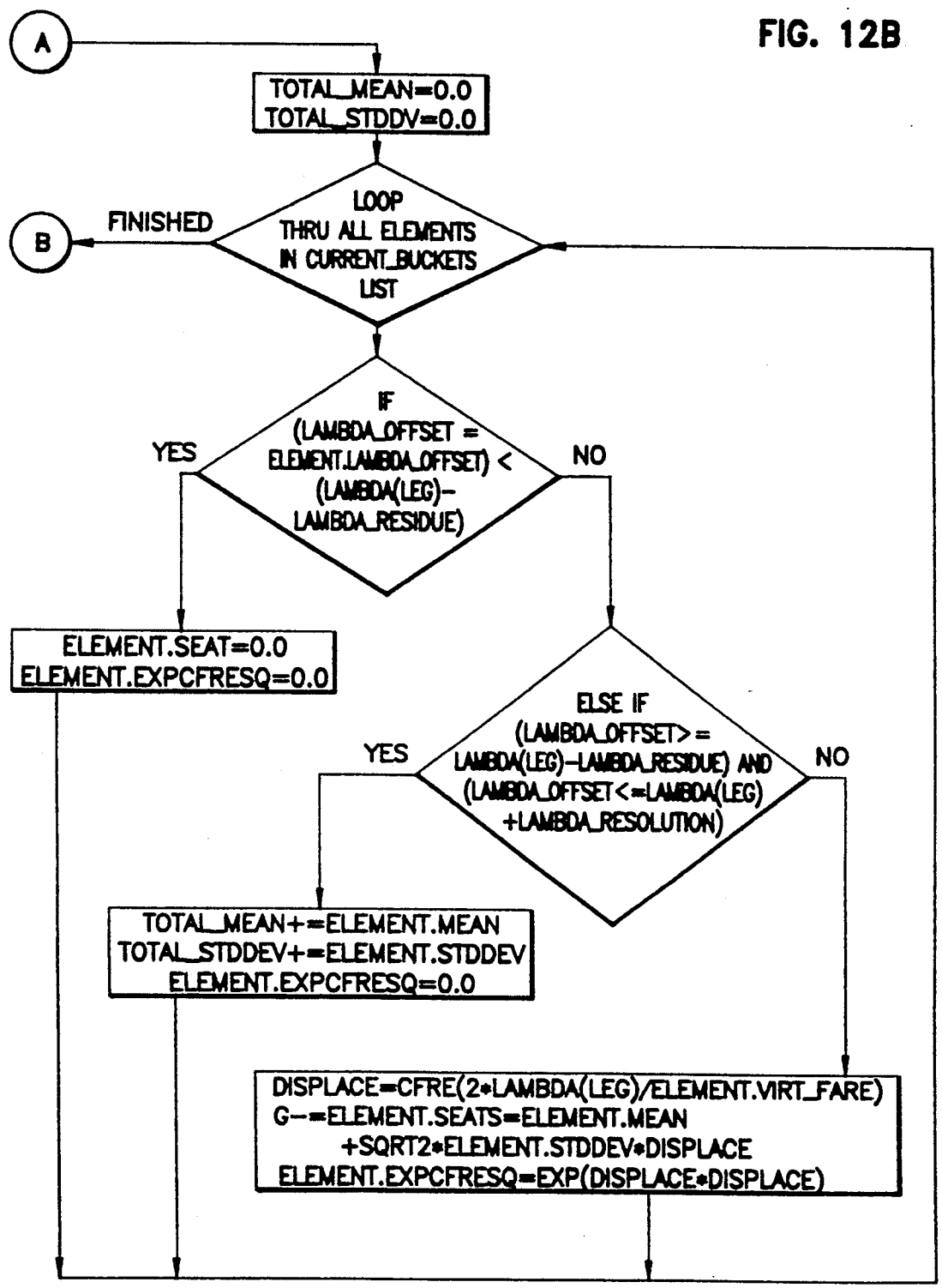

FIG. 12 is a flow chart describing the CALC LIMITS routine in the Unnested EMSR-Prorated Virtual Fare Method. This routine is called with a LEG parameter and calculates the residual capacity for the leg. It also calculates the booking limits for each itinerary/fare class combination. On each itinerary/fare class combination, a number of different special situations can occur: (1) the LAMBDA (LEG) may be less than EPSILON which means that the aggregated demand on the leg is far below the residual capacity and therefore every request can be satisfied; (2) the LAMBDA (LEG) may be greater than the ELEMENT.LAMBDA-OFFSET for the itinerary/fare class combination, in which case the booking limit is set to 0; and (3) the LAMBDA (LEG) may be close to the ELEMENT-.LAMBDA-OFFSET for the itinerary/fare class combination, in which case the itinerary/fare class is stored in a FIXED-BUCKET list.

At the start of the CALC LIMITS routine, the variable G stores the value of CAPACITY(LEG). If LAMBDA (LEG) is less than EPSILON, then a first branch occurs. The local variables TOTAL-MEAN and TOTAL-STDDEV are set to 0. A first loop is performed for every element in the CURRENT-BUCKETS list. If ELEMENT.VIRT-FARE is greater than or equal to EPSILON, then ELEMENT.MEAN is added to TOTAL-MEAN and the square of ELEMENT.STDDEV is added to TOTAL-STDDEV. When the first loop terminates, the square root of the TOTAL-STDDEV is calculated and stored therein. The TOTAL-MEAN is added to three times TOTAL-STDDEV and subtracted from G. If G is greater than 0, then G is set to 0. The routine then terminates. If LAMBDA (LEG) is greater than or equal to EPSILON, then a second branch occurs. The local variables TOTAL-MEAN and TOTAL-STDDEV are set to 0.

A FIXED-BUCKETS list is initialized with 0 elements on the list. A second loop is performed for every element in the CURRENT-BUCKETS list. LAMBDA-OFFSET is set to the value of ELEMENT.LAMBDA-OFFSET. If LAMBDA-OFFSET is less than the result of LAMBDA (LEG) minus LAMBDA-RESOLUTION, then ELEMENT.SEAT is set to 0, ELEMENT.EXPCFRESQ is set 0, and the second loop terminates. If LAMBDA-OFFSET is greater than or equal to the result of LAMBDA (LEG) minus LAMBDA-RESOLUTION and LAMBDA-OFFSET is less than or equal to the result of LAMBDA (LEG) plus LAMBDA-RESOLUTION, then ELEMENT.MEAN is added to TOTAL-MEAN; ELEMENT.STDDEV is added to TOTAL-STDDEV; a new element is allocated and inserted into the FIXED-BUCKETS list; ELEMENT.EXPCFRESQ is set to 0, and the second loop terminates. If LAMBDA-OFFSET is greater than the result of LAMBDA (LEG) plus LAMBDA-RESOLUTION, then the local variable DISPLACE is set to the value returned by the CFRE routine, ELEMENT-.SEATS is set to the result of ELEMENT.MEAN plus the result of the square root of 2 multiplied by ELEMENT.STDDEV multiplied by DISPLACE, G has subtracted from it ELEMENT.SEATS, ELEMENT-.EXPCFRESQ is set to the value of the exponential value of DISPLACE squared, and the second loop terminates. After the second loop terminates, then if the variable G is greater than 0, then DISPLACE is set to the result of G minus TOTAL-MEAN, the result thereof divided by TOTAL-STDDEV. If DISPLACE is greater than $-2.5$, then DISPLACE is set to $-2.5$. A third loop is performed for all elements in the FIXED-BUCKETS list. The value of ELEMENT.SEATS is set to the result of ELEMENT.MEAN plus the result of ELEMENT.STDDEV multiplied by DISPLACE. The value of G has subtracted from it the value of ELEMENT.SEATS. The first element of the FIXED-BUCKETS list is then deleted and the third loop terminates. On the other hand, if the variable G is less than or equal to 0 after termination of the second loop, then a fourth loop is performed for every element in the FIXED-BUCKETS list. The value of ELEMENT.SEATS is set to 0 and the element is deleted from the FIXED-BUCKETS list.

Figure 13:
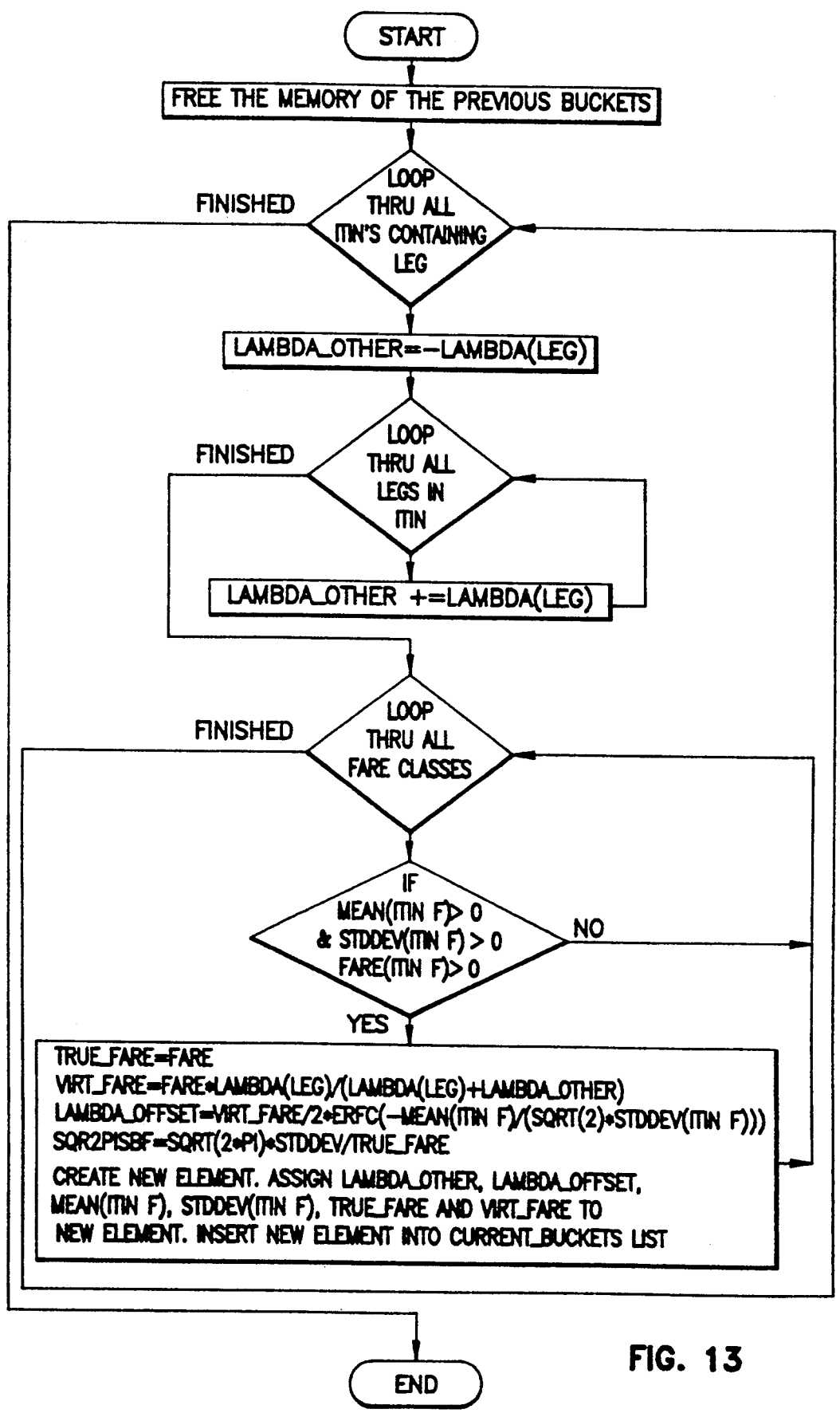
FIG. 13 is a flow chart describing the CONSTRUCT VIRTUAL FARES routine in the unnested EMSR-prorated virtual fare method.

FIG. 13 is a flow chart describing the CONSTRUCT VIRTUAL FARES routine in the Unnested EMSR-Prorated Virtual Fare Method. This routine constructs EMSR-prorated fares for each bucket element. For each itinerary using the leg, the ELEMENT.LAMBDA-OTHER variable is determined by subtracting the LAMBDA(LEG) from the ELEMENT.LAMBDA-SUM of the itinerary. Then, for each itinerary/fare class combination, the ELEMENT.VIRT-FARE is calculated by multiplying the ELEMENT.TRUE-FARE by the LAMBDA(LEG) and dividing by the LAMBDA-SUM. If the ELEMENT.VIRT-FARE is greater than 0, then a CURRENT-BUCKETS list element is created and linked to the existing CURRENT-BUCKETS list.

The CONSTRUCT VIRTUAL FARES routine is called with a LEG parameter and upon starting, the memory of the previous buckets is de-allocated. A first loop is performed for all paths containing the leg. The value of ELEMENT.LAMBDA-OTHER is set to the value of a negative LAMBDA (LEG). A second loop is performed for every leg of the path. The LAMBDA (LEG) value is added to ELEMENT.LAMBDA- OTHER. Upon termination of the second loop, a third loop is performed for each fare of the path. If MEAN(ITIN-F), STDDEV(ITIN-F), and FARE(ITIN-F) are all greater than 0, then a new element is allocated and the following actions are performed therefor: the value of ELEMENT.TRUE-FARE is set to the value of FARE(ITIN-F); the value of ELEMENT.VIRT-FARE is set to the result of FARE(ITIN-F) multiplied by LAMBDA(LEG) and divided by the result of LAMBDA(LEG) plus ELEMENT.LAMBDA-OTHER; the value of ELEMENT.LAMBDA-OFFSET is set to the result of:

(ELEMENT.VIRT-FARE)/2
(erfc(−MEAN(ITIN−F)/($\sqrt{2}$)
(STDDEV(ITIN−F))))

and the ELEMENT.SQR2PISBF is set to the result of:

($\sqrt{2\pi}$)
(STDDEV(ITIN-F))/(ELEMENT.TRUE-FARE)

Figure 14:
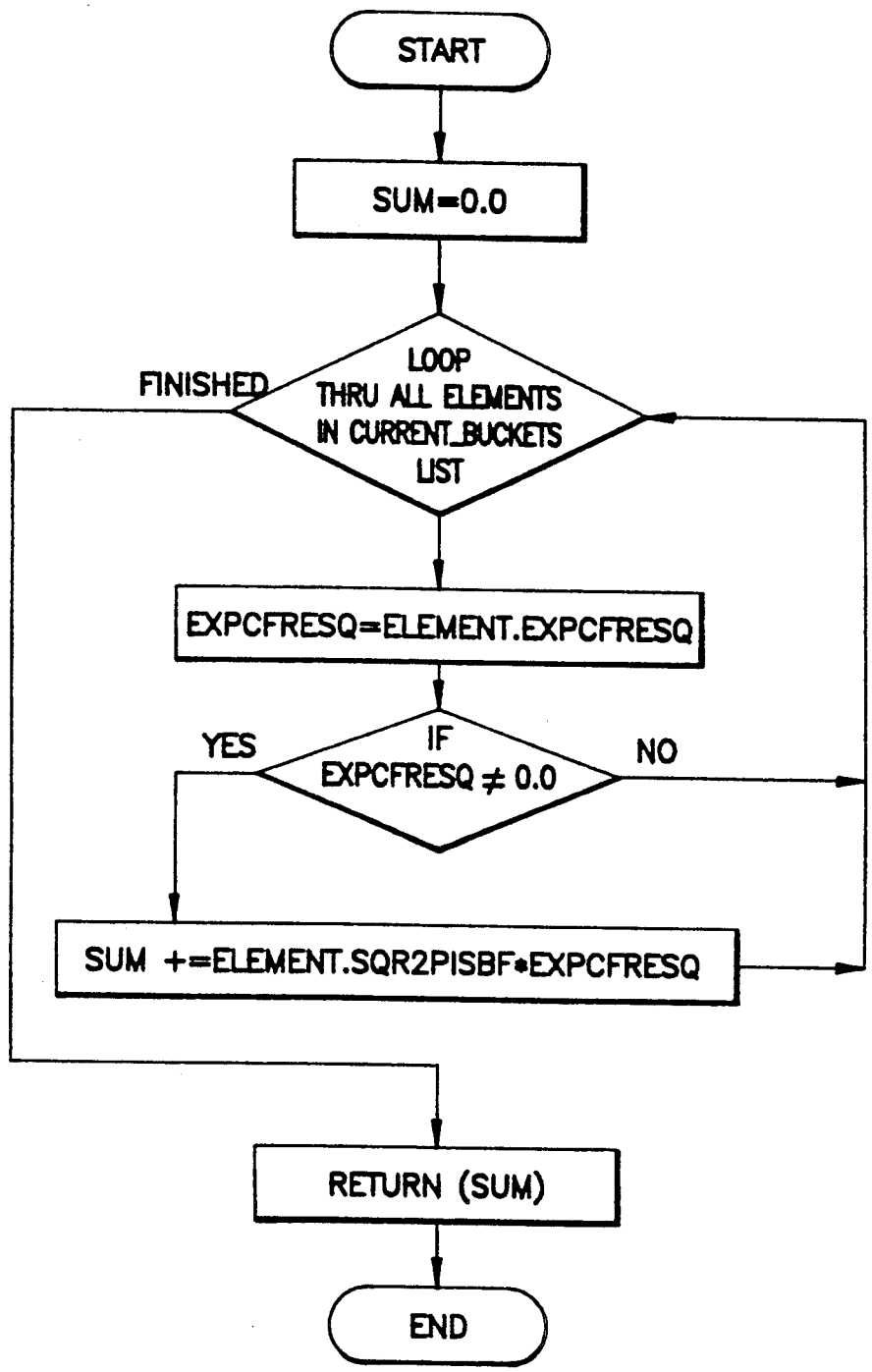
FIG. 14 is a flow chart describing the DELFUNC routine.

FIG. 14 is a flow chart describing the DELFUNC routine. This routine is called with a LEG parameter and calculates the following value for the buckets on a given leg:

($\sqrt{2\pi}$) $\sigma$/(ELEMENT.TRUE-FARE)
exp((cfre(2$\lambda$/(ELEMENT.VIRT-FARE)))$^2$)

In a simple LAMBDA (LEG) calculation, there is no distinction between true fares and virtual fares, but this routine accounts for the fact that virtual fares change with the LAMBDA (LEG).

At the start of the DELFUNC routine, a local variable SUM is set to 0. A first loop is performed for every element in the CURRENT-BUCKETS list. If ELEMENT.EXPCFRESQ is not 0, then the value of ELEMENT.SQR2PISBF multiplied by ELEMENT.EXPCFRESQ and the result thereof added to SUM. The value of SUM is returned to the calling routine when DELFUNC terminates.

Figure 15:
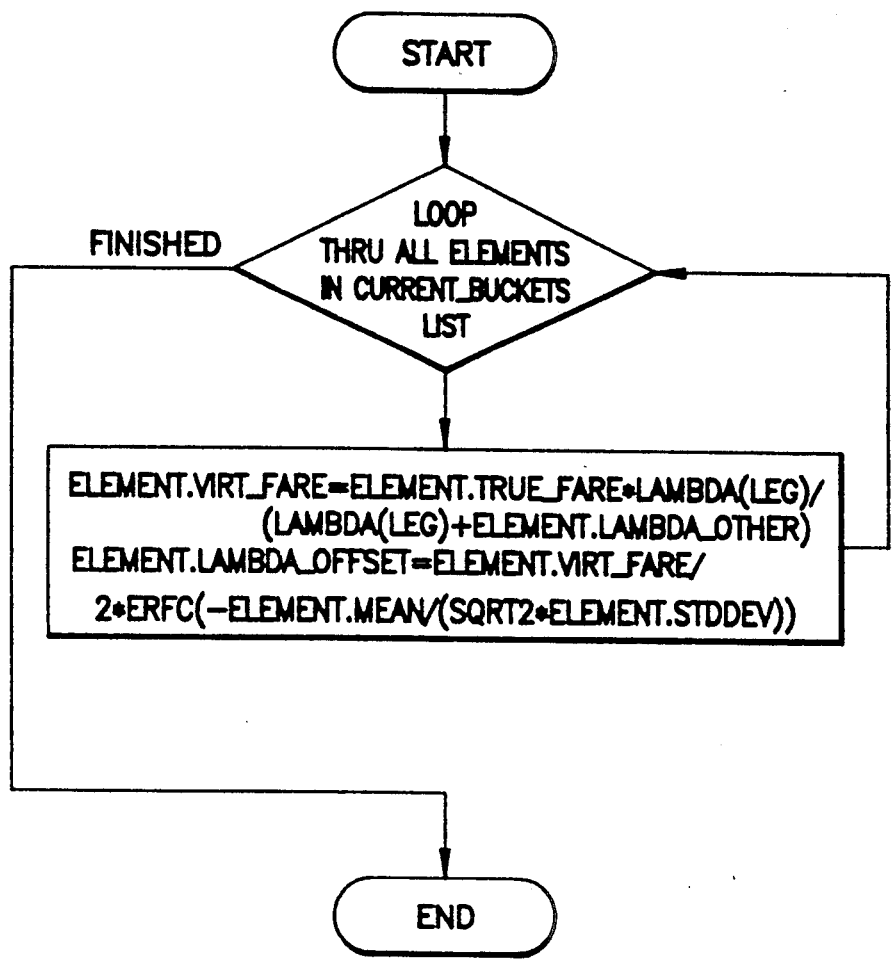
FIG. 15 is a flow chart describing the UPDATE VIRTUAL FARES routine in the unnested EMSR-prorated virtual fare method.

FIG. 15 is a flow chart describing the UPDATE VIRTUAL FARES routine in the Unnested EMSR-Prorated Virtual Fare Method. This routine is called with a LEG parameter and updates the virtual fares using the new LAMBDA (LEG) value. The virtual fares are calculated by multiplying ELEMENT.TRUE-FARE by the LAMBDA (LEG) and dividing by the LAMBDA-SUM.

At the start of the UPDATE VIRTUAL FARES routine, a first loop is performed for every element in the CURRENT-BUCKETS list. The ELEMENT.VIRT-FARE is set to the result of ELEMENT.TRUE-FARE multiplied by LAMBDA(LEG) and divided by the result of LAMBDA(LEG) plus ELEMENT.LAMBDA-OTHER. The ELEMENT.LAMBDA-OFFSET is set to the result of:

(ELEMENT.VIRT−FARE)/2(erfc(-
(−ELEMENT.MEAN)/($\sqrt{2}$)
(ELEMENT.STDDEV))

After the first loop, the routine terminates.

Figure 16:
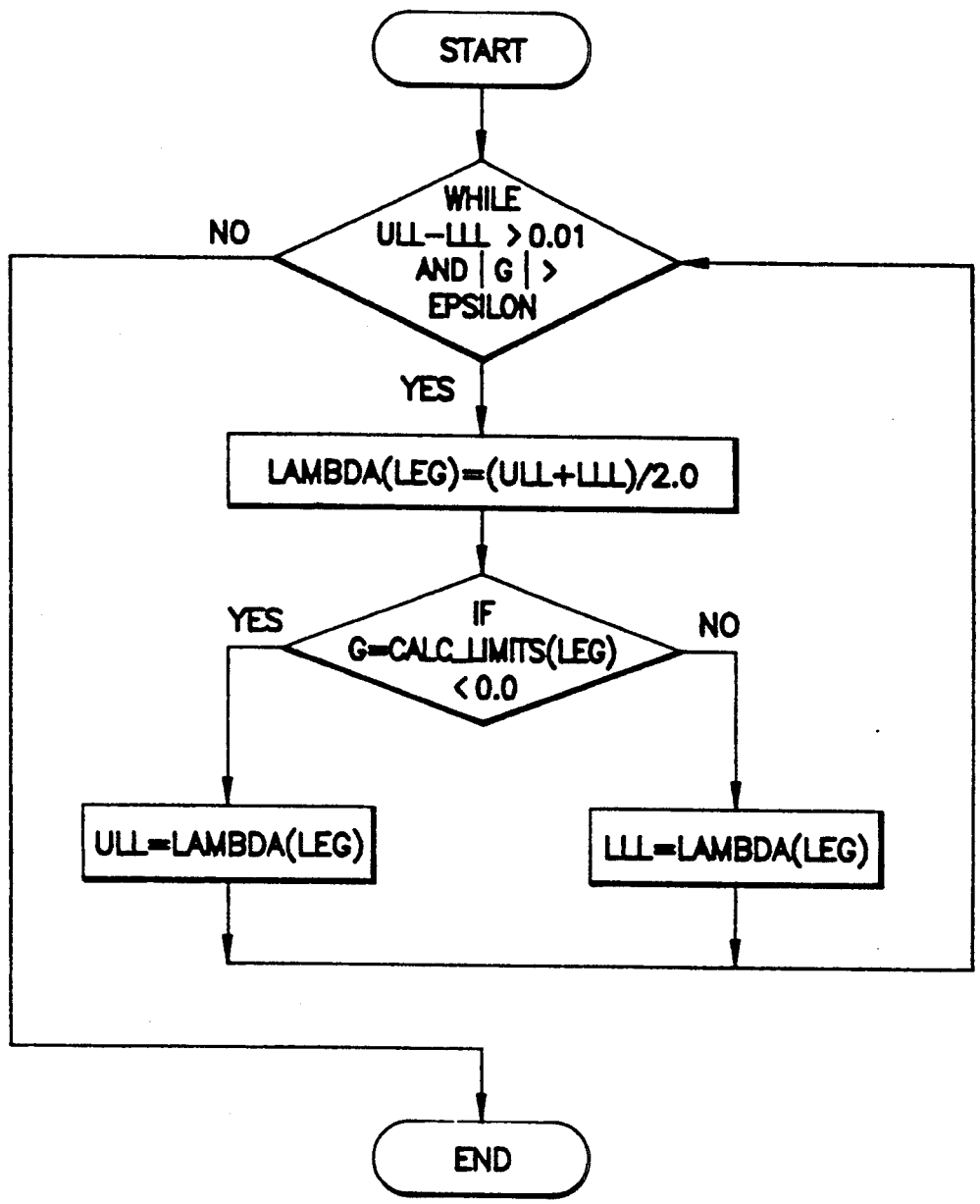
FIG. 16 is a flow chart describing the BINARY routine.

FIG. 16 is a flow chart describing the BINARY routine. This routine is called with a LEG parameter and uses a binary search to calculate LAMBDA(LEG) for a given leg, when the other methods have failed. After the BINARY routine starts (556), a first loop is executed until the difference between ULL and LLL is less than the EPSILON tolerance value, and the absolute value of G is less than the EPSILON tolerance value (558). The LAMBDA(LEG) is calculated as (560):

$$\lambda(LEG) = \frac{ULL + LLL}{2}$$

If G, which is the returned value from the routine CALCULATE LIMITS, is less than 0 (562), then ULL is set to the $\lambda$(LEG) value (564). Otherwise (562), if G is greater than or equal to 0 (562), then LLL is set to the $\lambda$(LEG) value (566). The first loop terminates when complete (558), and the BINARY routine then terminates (568).

VII. Implementation Of Nested EMSR-Prorated Virtual Fare

FIGS. 17–21 are flow charts describing the operation of a number of routines of a computer program in the Nested EMSR-Prorated Virtual Fare Method. For each flight leg in the network which still has residual capacity, an EMSR-prorated virtual fare is computed for each itinerary/fare class that contains the leg using previously calculated EMSR's. The itinerary/fare classes are then sorted in order of descending virtual fare. Next, by processing this sorted list of virtual fares one-by-one, a trace is made upward to the left along the staircase graph of FIG. 3 to find its intersection with the straight line through the origin. This intersection point defines a new EMSR for the leg, but since EMSR-prorated virtual fares depend on the EMSR of this leg, they must be recalculated and re-sorted, and the intersection point for the leg must be recomputed. This process is repeated until the EMSR on this leg converges; then the next leg is processed. The loop terminates when a pass through all legs in the network results in no significant change (by more than a penny) in any EMSR.

The following symbols are used in the flow charts and the descriptions thereof:

1. LEG is an index to a leg of an itinerary or path.
2. ITIN is an itinerary (also termed "path").
3. ITIN-F is an itinerary/fare class combination.
4. CAPACITY(LEG) is the seating capacity of the LEG.
5. LAMBDA(LEG) is the expected marginal seat revenue (EMSR) generated by increasing the capacity of the leg by 1 seat.
6. MEAN(ITIN-F) is the mean of the demand for the ITIN-F.
7. STDDEV(ITIN-F) is the standard deviation of the demand for the ITIN-F (i.e., STDDEV(ITIN-F)$^2$ is the variance of the demand for the ITIN-F).
8. FARE(ITIN-F) is the fare for an ITIN-F.
9. DELTA is the change in the EMSR, i.e., LAMBDA (LEG).
10. EPSILON is a tolerance value.
11. FIXED(LEG) is a flag that indicates whether the LEG has been "fixed", i.e., wherein some virtual fare is approximately equal to the LAMBDA(LEG) value.
12. CURRENT-BUCKETS is a list of ITIN-F's that use the LEG. Each ITIN-F containing the LEG is represented by a bucket element. In this manner, all ITIN-F's using the LEG can be tracked so that seats can be allocated among the ITIN-F's.
13. Each element of a bucket list contains the following variables:

a. PATH-NUM is the path, i.e., ITIN, that gives rise to the bucket.
b. FARE-IND is the fare class that gives rise to the bucket.
c. ELEMENT.MEAN is the mean for the bucket.
d. ELEMENT.STDDEV is the standard deviation for the bucket.
e. ELEMENT.TRUE-FARE is the true fare for the corresponding fare class/itinerary combination.
f. ELEMENT.VIRT-FARE is the virtual fare for the bucket.
g. ELEMENT.LAMBDA-OTHER is the summation of LAMBDA(LEG) on other legs in the itinerary.

Figure 17:
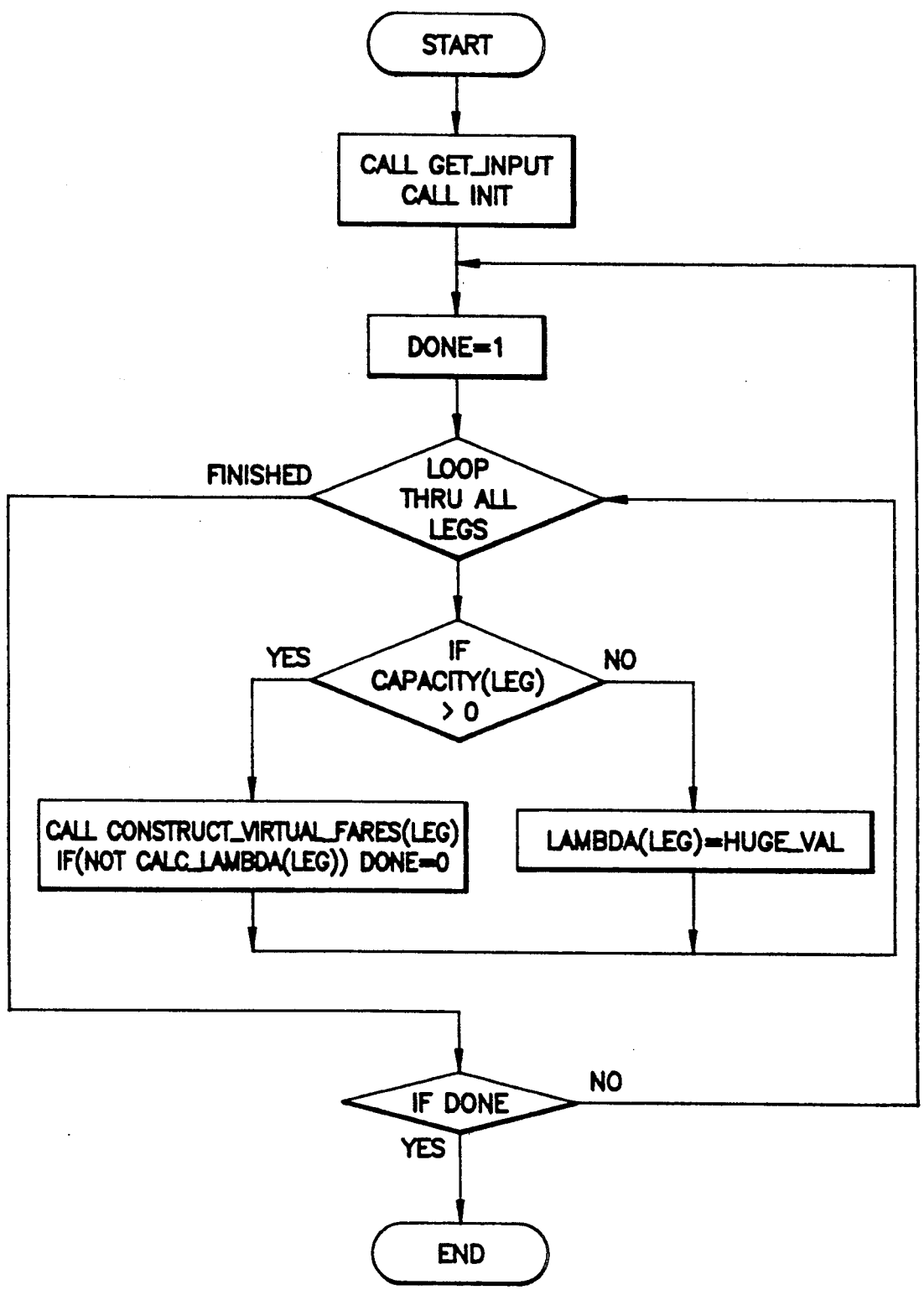
FIG. 17 is a flow chart describing the MAIN routine in the nested EMSR-prorated virtual fare method.

FIG. 17 is a flow chart describing the MAIN routine in the Nested EMSR-Prorated Virtual Fare Method. At the start of the MAIN routine, the GET INPUT and INIT routines are called. The variable DONE is set to the value 1. A loop is performed for each leg in the network. If the leg has residual capacity, then the CONSTRUCT VIRTUAL FARES routine is called for the leg. The CALC LAMBDA routine is called and if the return value therefrom is 0, then the DONE variable is set to 0. If the leg does not have residual capacity, then LAMBDA (LEG) is set to infinity, which is referred to as HUGE-VAL. When the first loop terminates, after examining each leg in the network, the DONE variable is examined. If the DONE variable is 0, the loop is performed again; otherwise, the MAIN routine terminates.

Figure 18:
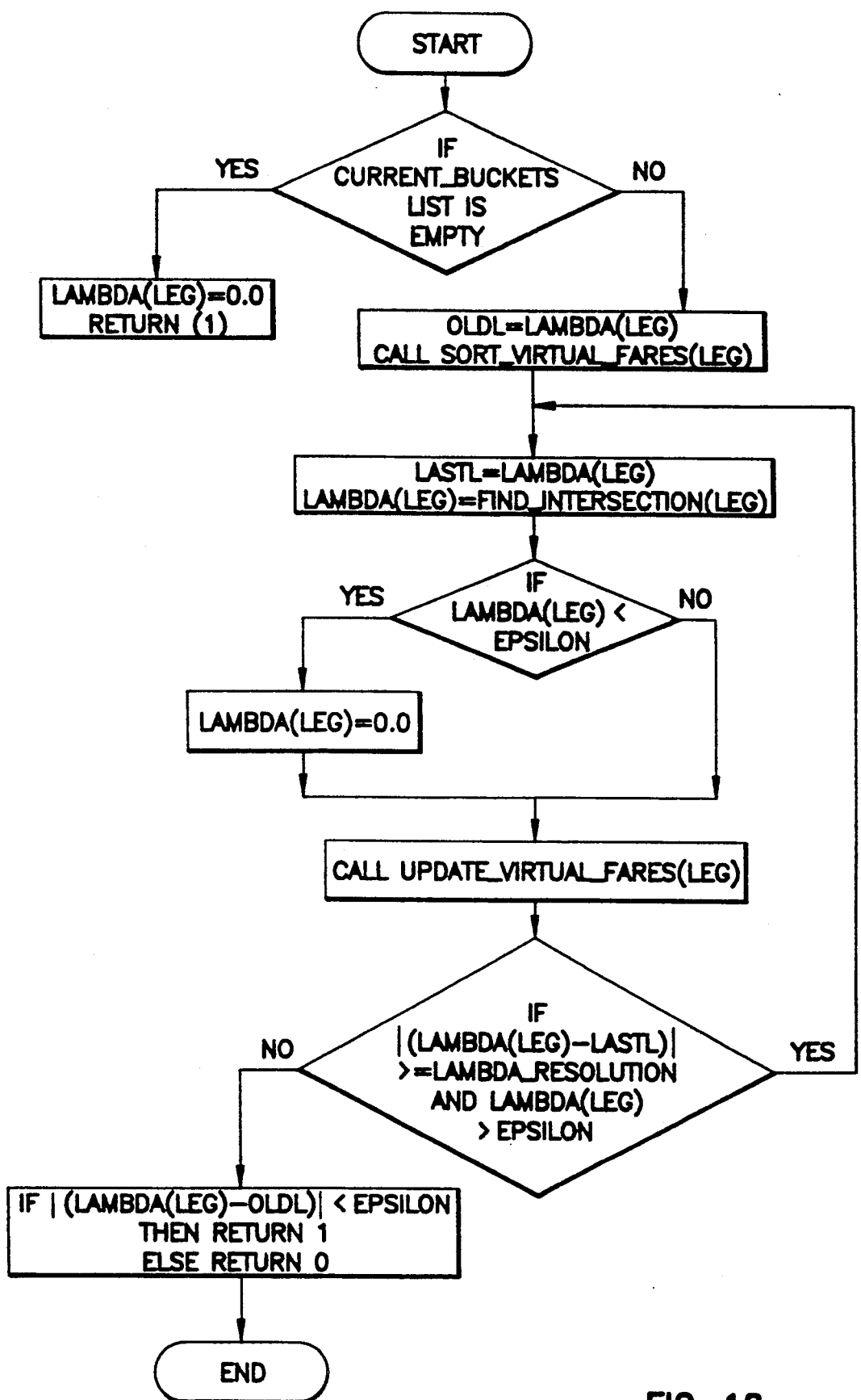
FIG. 18 is a flow chart describing the CALC LAMBDA routine in the nested EMSR-prorated virtual fare method.

FIG. 18 is a flow chart describing the CALC LAMBDA routine in the Nested EMSR-Prorated Virtual Fare Method. The CALC LAMBDA routine calculates the LAMBDA (LEG) value. The routine is called with a LEG parameter. If the CURRENT-BUCKETS list is empty, then LAMBDA (LEG) is set to 0 and a value of 1 is returned to the calling procedure. Otherwise, LAMBDA (LEG) is temporarily stored in the variable OLDL. The SORT VIRTUAL FARES routine is called to sort the virtual fares for the leg in ascending order (using any known sort technique). The LAMBDA (LEG) is stored is stored in the variable LASTL and a new LAMBDA (LEG) value is calculated by the FIND INTERSECTION routine. If LAMBDA (LEG) is less than the EPSILON value, then LAMBDA (LEG) is set to 0. The UPDATE VIRTUAL FARES routine is called for the leg. The value of LASTL is subtracted from LAMBDA (LEG), and if the absolute value thereof is greater than or equal to LAMBDA-RESOLUTION, and if LAMBDA (LEG) is greater than EPSILON, then a value of 1 is returned to the calling procedure. Otherwise, the LAMBDA (LEG) is calculated again.

Figure 19:
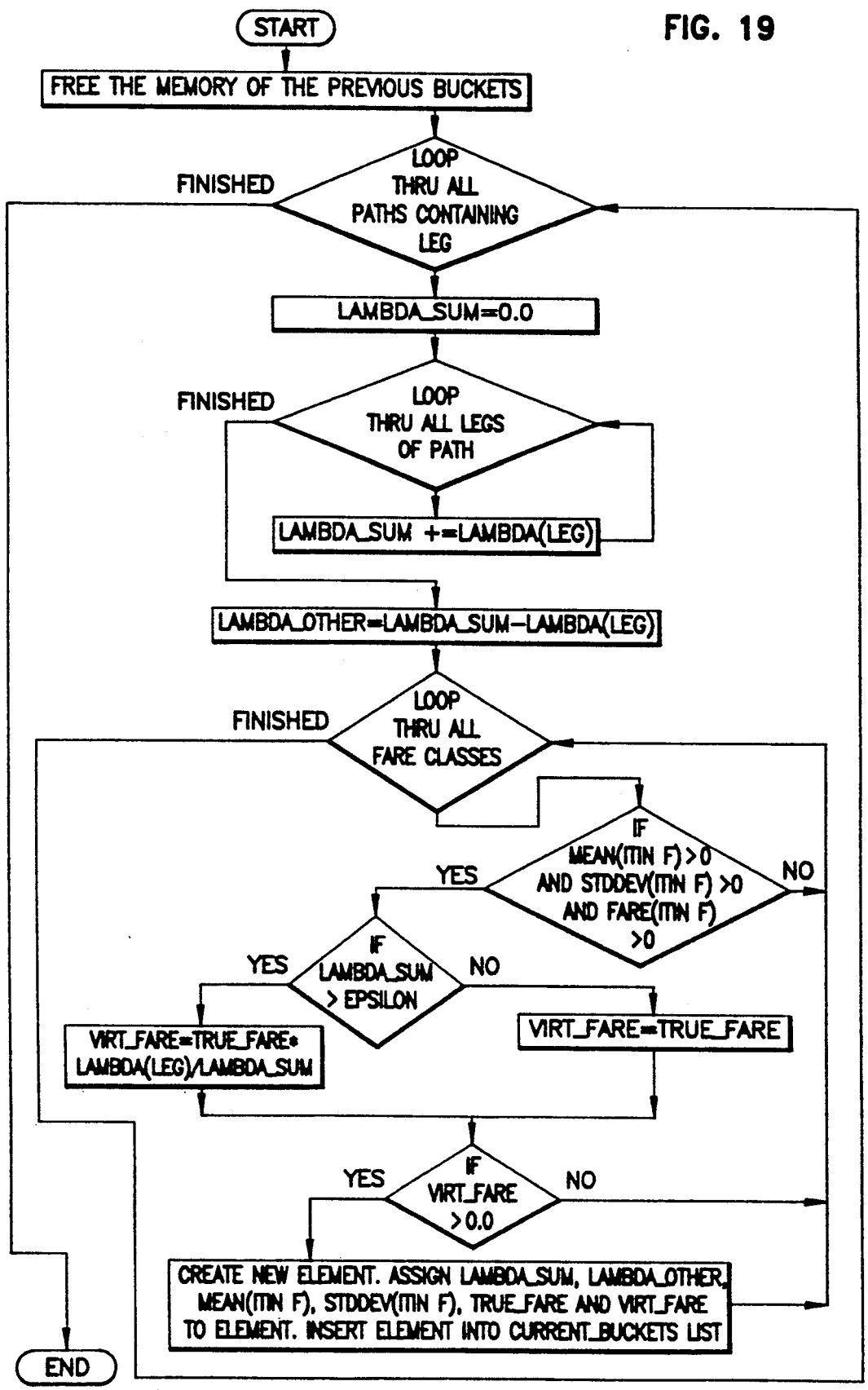
FIG. 19 is a flow chart describing the CONSTRUCT VIRTUAL FARES routine in the nested EMSR-prorated virtual fare method.

FIG. 19 is a flow chart describing the CONSTRUCT VIRTUAL FARES routine in the Nested EMSR-Prorated Virtual Fare Method. This routine constructs EMSR-prorated fares for each bucket element. This routine is called with a LEG parameter. First, the routine de-allocates previous bucket elements. A first loop is performed for all paths containing the leg. The value of the LAMBDA-SUM variable is set to zero. A second loop is performed for each leg in the path. The LAMBDA (LEG) values for each leg in the path are added to LAMBDA-SUM. After the second loop terminates, LAMBDA-OTHER is set to the value of LAMBDA-SUM minus LAMBDA (LEG). A third loop is performed for each fare of the path. If the MEAN(ITIN-F), STDDEV(ITIN-F), and FARE(I-TIN-F) are all greater than 0, then the LAMBDA-SUM is examined to see if it is greater than the EPSILON value. If it is greater, then the ELEMENT.VIRT-FARE is set to the value of ELEMENT.TRUE-FARE multiplied by the LAMBDA (LEG) and divided by the LAMBDA-SUM. If the LAMBDA-SUM is less than the EPSILON value, then the ELEMENT.VIRT-FARE is set to the value of ELEMENT.TRUE-FARE. If the ELEMENT.VIRT-FARE is greater than 0, then memory is allocated for another element in the CURRENT-BUCKET list and the element is inserted therein. The third loop and first loops terminate and the routine terminates.

Figure 20:
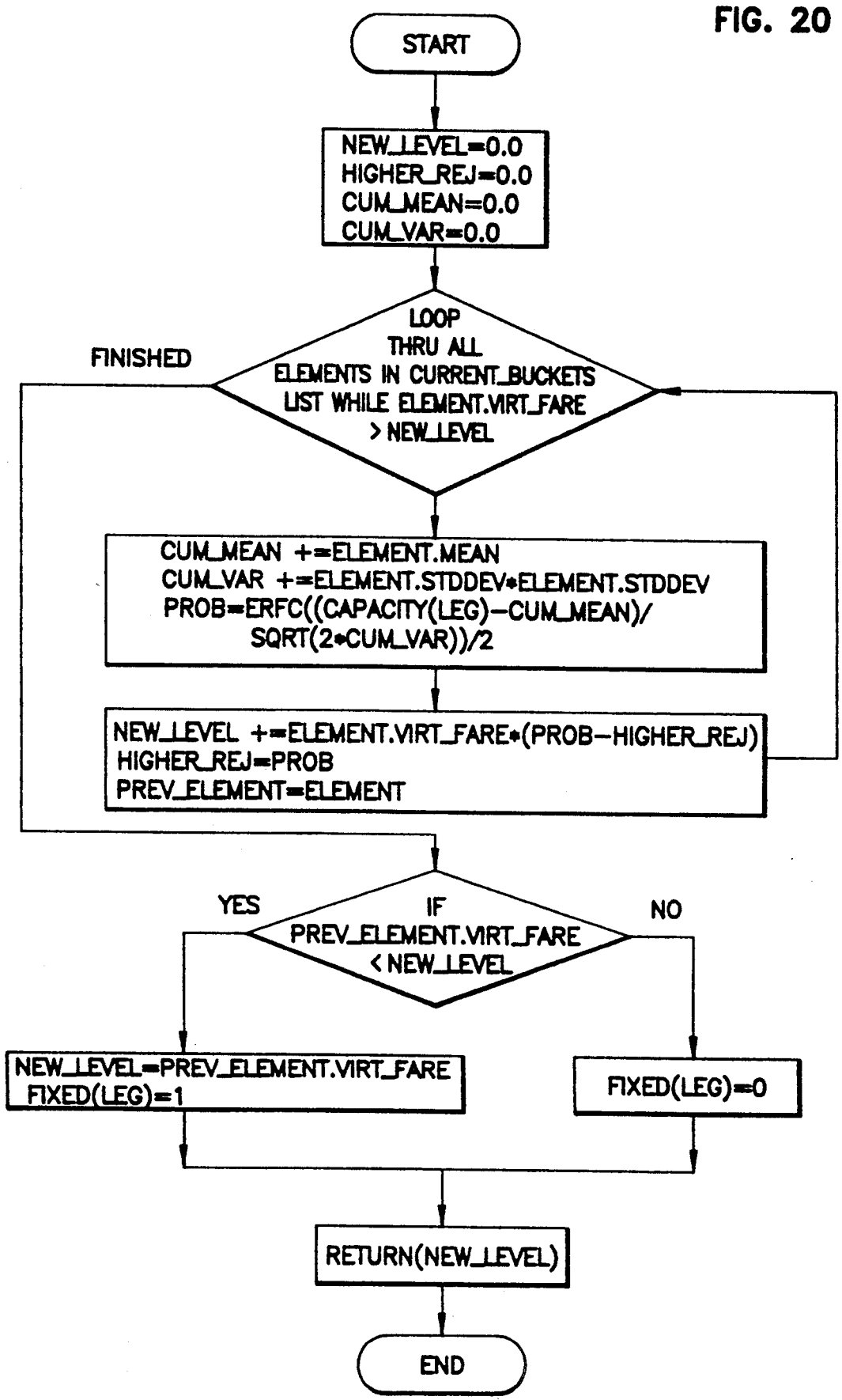
FIG. 20 is a flow chart describing the FIND INTERSECTION routine in the nested EMSR-prorated virtual fare method.

FIG. 20 is a flow chart describing the FIND INTERSECTION routine in the Nested EMSR-Prorated Virtual Fare Method. This routine is called with a LEG parameter. At the start, local variables NEW-LEVEL, HIGHER-REJ, CUM-MEAN, AND CUM-VAR are set to 0. A first loop is performed for every element in the CURRENT-BUCKETS list so long as ELEMENT.VIRT-FARE for each elements is greater than NEW-LEVEL. Each ELEMENT.MEAN is added to CUM-MEAN. Each ELEMENT.STDDEV is squared and added to CUM-VAR. A value for the variable PROB is calculated as:

$$PROB = \mathrm{erfc}\left(\frac{1}{2}\left(\frac{(CAPACITY(LEG)) - (CUM\text{-}MEAN)}{\sqrt{2(CUM\text{-}VAR)}}\right)\right)$$

The variable PROB could be calculated differently if an alternate demand distribution model is used.

ELEMENT.VIRT-FARE is multiplied by the result of PROB minus HIGHER-REJ, and the result added to NEW-LEVEL. Then, HIGHER-REJ is set equal to PROB. Upon termination of the first loop, the ELEMENT.VIRT-FARE of the last element processed in the first loop is compared to NEW-LEVEL. If ELEMENT.VIRT-FARE of the last element is less than NEW-LEVEL, then NEW-LEVEL is set to the value of ELEMENT.VIRT-FARE of the last element and the FIXED(LEG) is set to a value of 1. If the ELEMENT.VIRT-FARE of the last element is greater than or equal to NEW-LEVEL, then FIXED(LEG) is set to a value of 0. The NEW-LEVEL value is then returned to the calling routine.

Figure 21:
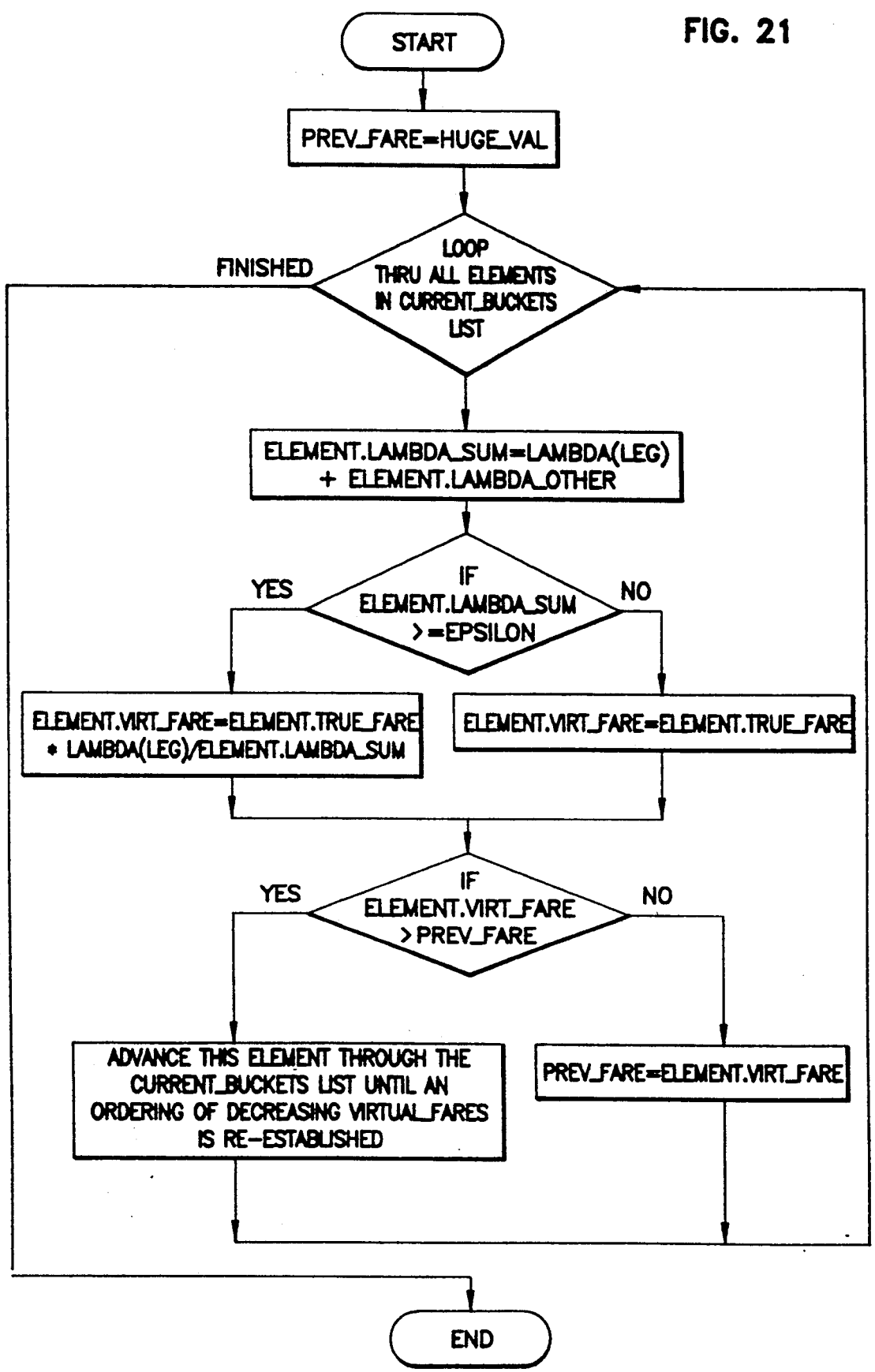
FIG. 21 is a flow chart describing the operation of the UPDATE VIRTUAL FARES routine in the nested EMSR-prorated virtual fare method.

FIG. 21 is a flow chart describing the UPDATE VIRTUAL FARES routine in the Nested EMSR-Prorated Virtual Fare Method. This routine is called with a LEG parameter. A local variable PREV-FARE is set to infinity, which is referred to as HUGE-VAL. A first loop is performed for all elements in the CURRENT-BUCKETS list. For each element, the LAMBDA(LEG) is added to ELEMENT.LAMBDA-OTHER, and the result therefrom is stored in LAMBDA-SUM. If LAMBDA-SUM is greater than or equal to EPSILON, then ELEMENT.VIRT-FARE is set to the value of the ELEMENT.TRUE-FARE multiplied by LAMBDA (LEG) and divided by LAMBDA-SUM. If LAMBDA-SUM is less than EPSILON, then ELEMENT.VIRT-FARE is set to the value of ELEMENT.TRUE-FARE. If ELEMENT.VIRT-FARE is greater than the PREV-FARE, then the element is advanced through the CURRENT-BUCKETS list until an ordering of decreasing ELEMENT.VIRT-FARES is re-established. If ELEMENT.VIRT-FARE is less than or equal to PREV-FARE, then PREV-FARE is set to the value of ELEMENT.VIRT-FARE.

VIII. Implementation Of Nested EMSR-Differential Virtual Fare

FIGS. 22–25 are flow charts describing the operation of a number of routines of a computer program implementing the Nested EMSR-Differential Virtual Fare Method. For each flight leg in the network which still has residual capacity, an EMSR-differential virtual fare is computed for each itinerary/fare class that contains the leg using previously calculated EMSR's. The itinerary/fare classes are then sorted in order of descending virtual fare. Next, by processing this sorted list of virtual fares one-by-one, a trace is made upward to the left along the staircase graph of FIG. 3 to find its intersection with the straight line through the origin. This intersection point defines the new EMSR for the leg. The next leg is then processed. The loop terminates when a pass through all legs in the network results in no significant change (by more than a penny) in any EMSR.

The following symbols are used in the flow charts and the descriptions thereof:

1. LEG is an index to a leg of an itinerary or path.
2. ITIN is an itinerary (also termed "path").
3. ITIN-F is an itinerary/fare class combination.
4. CAPACITY(LEG) is the mean of the demand for the ITIN-F.
5. LAMBDA(LEG) is the expected marginal seat revenue (EMSR) generated by increasing the capacity of the leg by 1 seat.
6. FIXED(LEG) is a flag that indicates whether the LEG has been "fixed", i.e., wherein some virtual fare is approximately equal to the LAMBDA(LEG) value.
7. MEAN(ITIN-F) is the mean of the demand for the ITIN-F.
8. STDDEV(ITIN-F) is the standard deviation of the demand for the ITIN-F (i.e., STDDEV(ITIN-F)$^2$ is the variance of the demand for the ITIN-F).
9. FARE(ITIN-F) is the fare for an ITIN-F.
10. DELTA is the change in the EMSR, i.e., LAMBDA (LEG).
11. EPSILON is a tolerance value.
12. CURRENT-BUCKETS is a list of ITIN-F's that use a LEG. Each ITIN-F containing the LEG is represented by a bucket element. In this manner, all ITIN-F's using the LEG can be tracked so that seats can be allocated among the ITIN-F's.
13. Each element of a bucket list contains the following variables:
    a. PATH-NUM is the path index that gives rise to the bucket.
    b. FARE-IND is the fare class index that gives rise to the bucket.
    c. ELEMENT.MEAN is the mean of the demand for the ITIN-F.
    d. ELEMENT.STDDEV is the standard deviation of the demand for the ITIN-F.
    e. ELEMENT.TRUE-FARE is the true fare for the corresponding fare class/itinerary combination.
    f. ELEMENT.VIRT-FARE is the virtual fare for the bucket.

Figure 22:
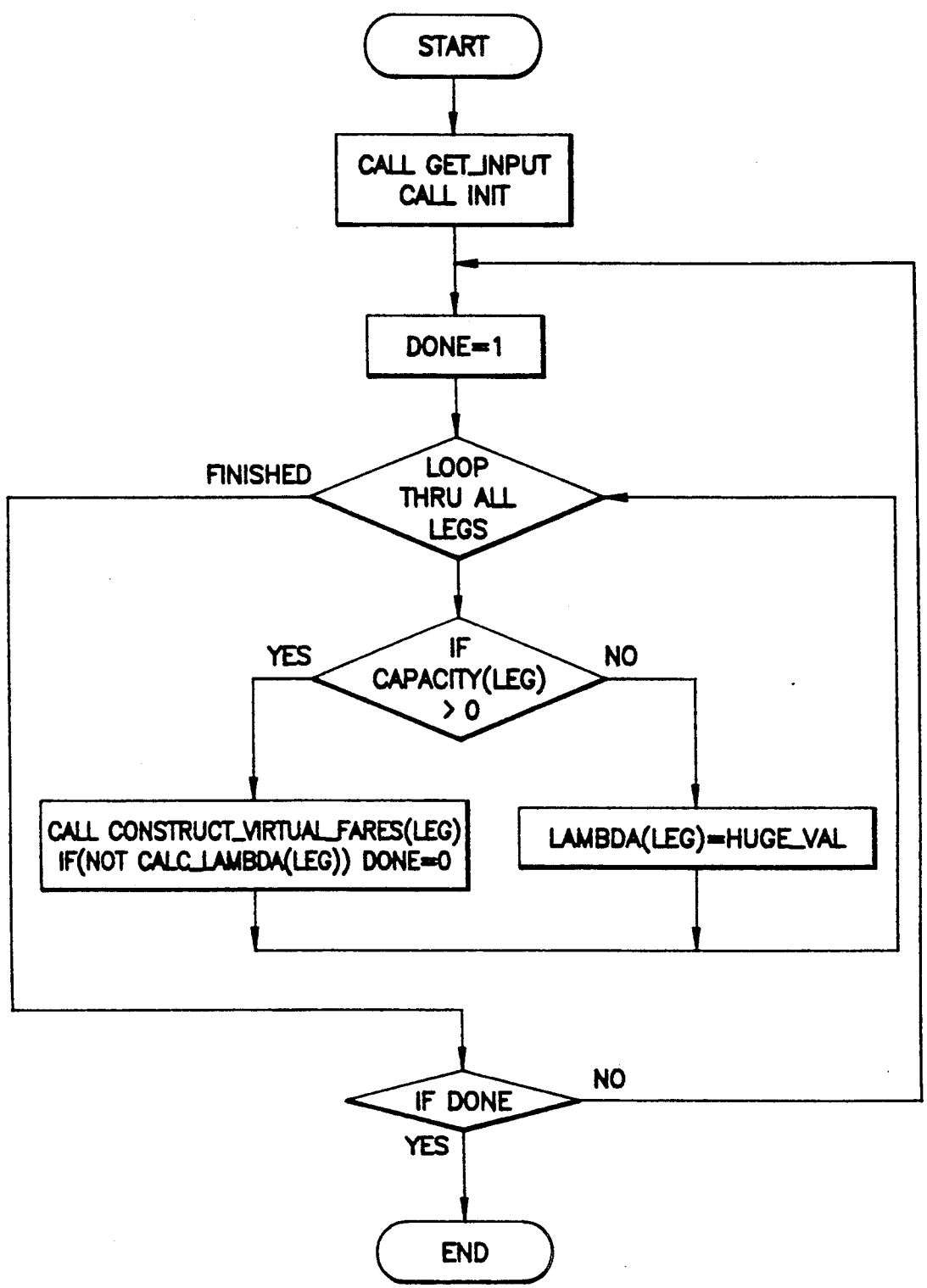
FIG. 22 is a flow chart describing the MAIN routine in the nested EMSR-differential virtual fare method.

FIG. 22 is a flow chart describing the MAIN routine in the Nested EMSR-Differential Virtual Fare Method. At the start of the MAIN routine, the GET INPUT and INIT routines are called. The variable DONE is set to the value 1. A first loop is performed for each leg in the network. If the leg has residual capacity, then the CONSTRUCT VIRTUAL FARES routine is called for the leg. The CALC LAMBDA routine is called and the return value therefrom is saved. If the return value is 0, then DONE is set to 0. If the leg does not have residual capacity, then LAMBDA (LEG) is set to infinity, which is referred to as HUGE-VAL. When the first loop terminates, after examining each leg in the network, the DONE variable is examined. If DONE is 0, then the loop is performed again; otherwise, the MAIN routine terminates.

Figure 23:
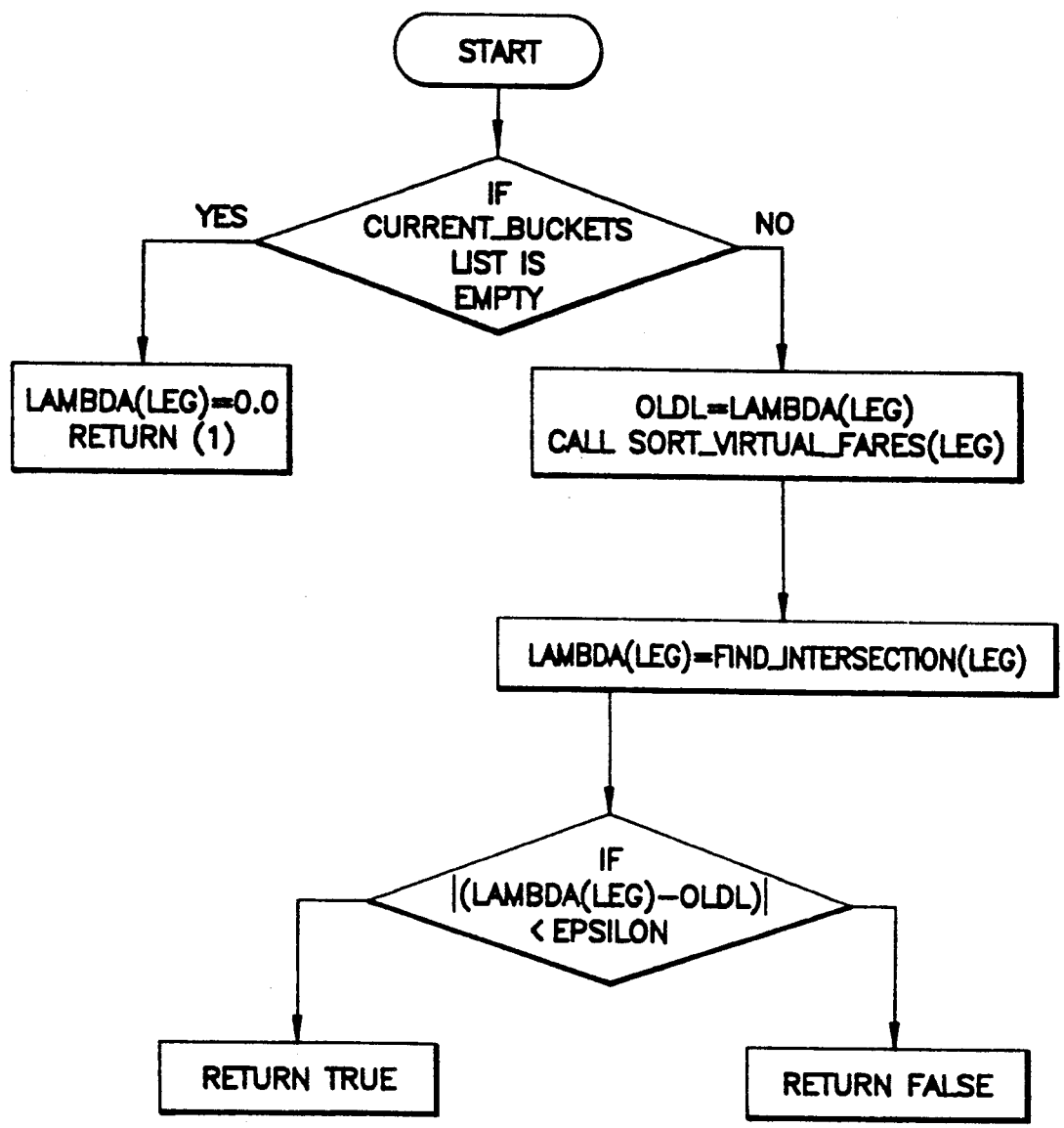
FIG. 23 is a flow chart describing the CALC LAMBDA routine in the nested EMSR-differential virtual fare method.

FIG. 23 is a flow chart describing the CALC LAMBDA routine in the Nested EMSR-Differential Virtual Fare Method. The CALC LAMBDA routine is called with a LEG parameter and calculates the LAMBDA (LEG) value. At the start of the routine, if the CURRENT-BUCKETS list is empty, then LAMBDA (LEG) is set to 0 and a true value is returned to the calling routine. Otherwise, the variable OLDL is set to the value of LAMBDA (LEG). The SORT VIRTUAL FARE routine is called for the leg. The FIND INTERSECTION routine is called for the leg and the value returned therefrom is stored in the LAMBDA (LEG). If the absolute value of the results of subtracting OLDL from LAMBDA (LEG) is less than EPSILON, then a true value is returned to the calling routine; otherwise a false value is returned.

Figure 24:
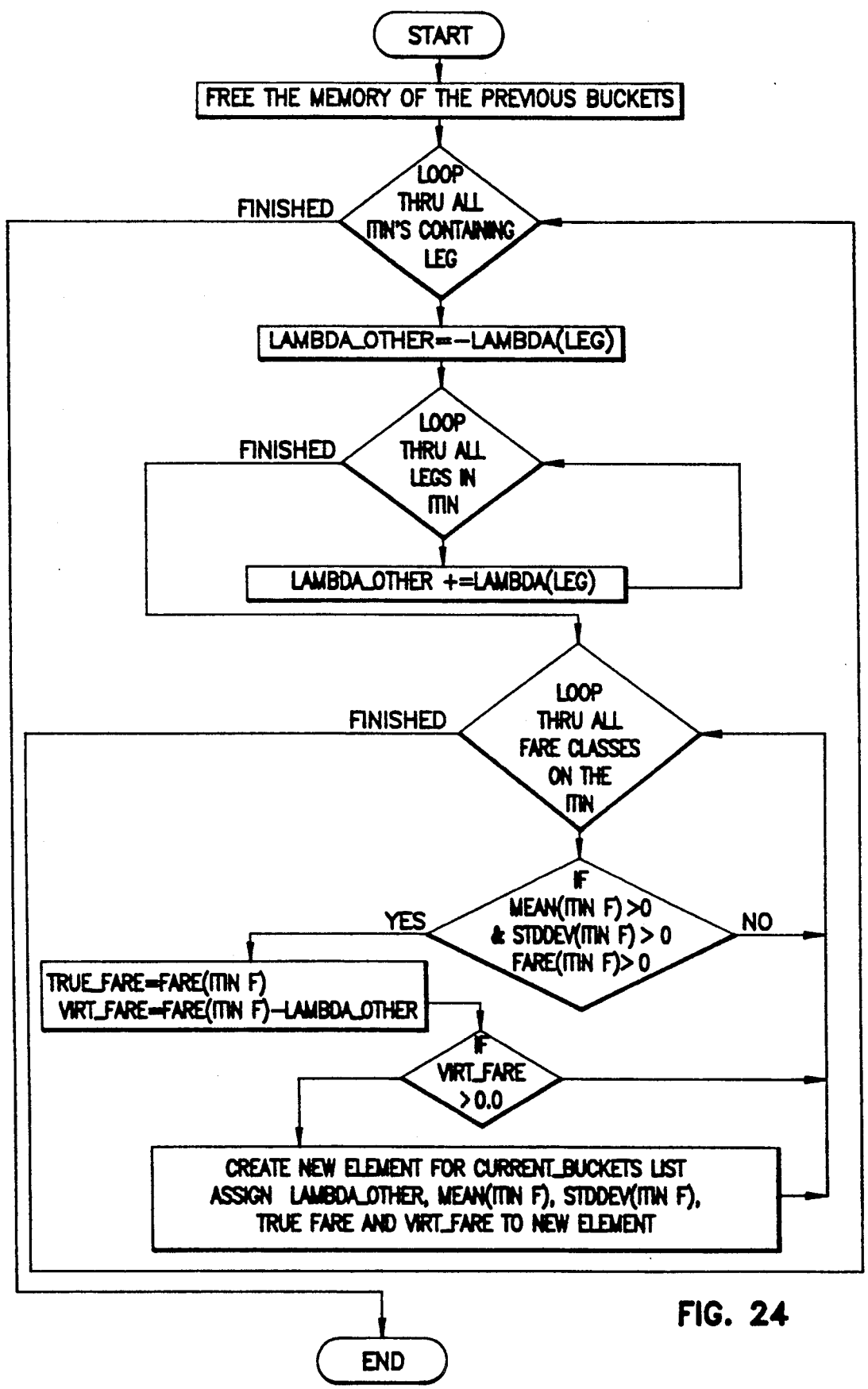
FIG. 24 is a flow chart describing the CONSTRUCT VIRTUAL FARES in the nested EMSR-differential virtual fare method.

FIG. 24 is a flow chart describing the CONSTRUCT VIRTUAL FARES routine in the Nested EMSR-Differential Virtual Fare Method. This routine is called with a LEG parameter and constructs EMSR-prorated fares for each bucket element. For each itinerary using the leg, the ELEMENT.LAMBDA-OTHER variable is determined by subtracting the LAMBDA(LEG) from the ELEMENT.LAMBDA-SUM of the itinerary. Then, for each itinerary/fare class combination, the ELEMENT.VIRT-FARE is calculated by subtracting ELEMENT.LAMBDA-OTHER from the ELEMENT.TRUE-FARE. If the ELEMENT.VIRT-FARE is greater than 0, then a CURRENT-BUCKETS list element is created and linked to the existing CURRENT-BUCKETS list.

The CONSTRUCT VIRTUAL FARES routine is called with a LEG parameter and constructs the ELEMENT.VIRT-FARE values. At the start of the routine, the memory of previous buckets is deallocated. A first loop is performed for all paths containing the leg. The variable LAMBDA-OTHER is set to the negative value of LAMBDA (LEG). A second loop is performed for all legs in the path. For each leg in the path, the LAMBDA (LEG) value is added to the LAMBDA-OTHER value. Upon termination of the second loop, a third loop is performed for each fare in the path. If the MEAN(ITIN-F), STDDEV(ITIN-F), and FARE(ITIN-F) are all greater than 0, then ELEMENT.TRUE-FARE is set to the value of FARE(ITIN-F) and ELEMENT.VIRT-FARE is set to the result of FARE(ITIN-F) minus LAMBDA-OTHER. If ELEMENT.VIRT-FARE is greater than 0, then a new element is created for the CURRENT-BUCKETS list and inserted therein.

Figure 25:
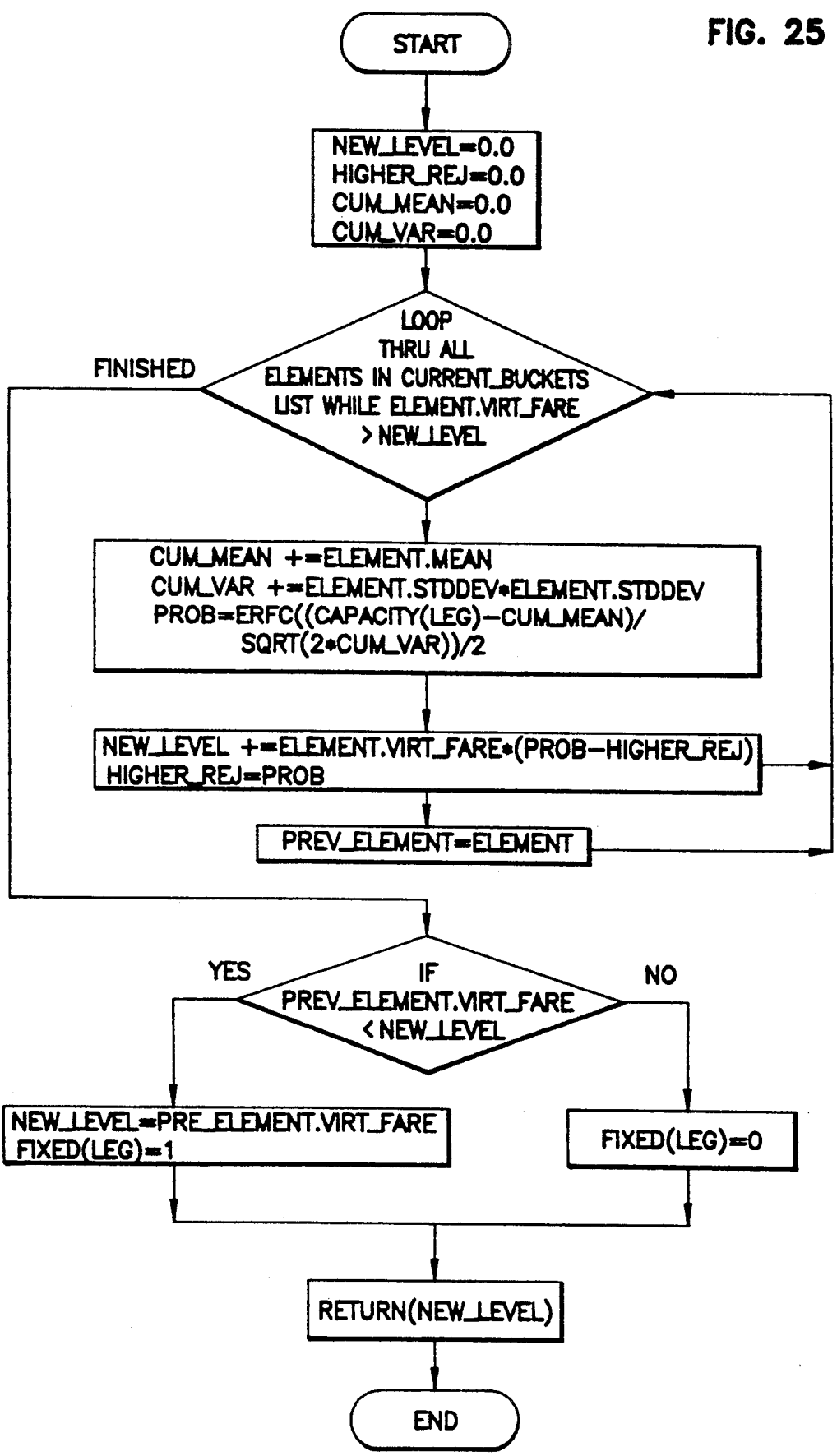
FIG. 25 is a flow chart describing the FIND INTERSECTION routine in the nested EMSR-differential virtual fare method.

FIG. 25 is a flow chart describing the FIND INTERSECTION routine in the Nested EMSR-Differential Virtual Fare Method. This routine is called with a LEG parameter. A number of local variables are initialized to 0, including NEW-LEVEL, HIGHER-REJ, CUM-MEAN, and CUM-VAR. A first loop is performed for all elements in the CURRENT-BUCKETS list while each ELEMENT.VIRT-FARE is greater than the value of NEW-LEVEL. The ELEMENT.MEAN is accumulated in the variable CUM-MEAN and the ELEMENT.STDDEV is squared and added to CUM-VAR. The variable PROB is calculated as:

$$\tfrac{1}{2}\text{erfc}((\text{CAPACITY}(\text{LEG}) - (\text{CUM}-\text{MEAN}))/\sqrt{2}\,(\text{CUM}-\text{VAR}))$$

The value of ELEMENT.VIRT-FARE is multiplied by the result of PROB minus HIGHER-REJ and the result thereof added to NEW-LEVEL. The value of HIGHER-REJ is set to the value of PROB. Upon termination of the first loop, if the last ELEMENT.VIRT-FARE is less than NEW-LEVEL, then NEW-LEVEL is set to the value of ELEMENT.VERT-FARE and FIXED(LEG) is set to 1. If the last ELEMENT.VIRT-FARE is less than NEW-LEVEL, then FIXED(LEG) is set to 0. The value of NEW-LEVEL is returned to the calling routine.

IX. Conclusion

This concludes the description of the three preferred embodiments of the present invention. The following paragraphs describe some alternative embodiments of the invention.

Any number of other yield management solutions could be substituted for the airline seat inventory control system described herein. Instead of using seats, itinerary/fare classes, and flight legs, the invention could be formulated in terms of resources, demand categories, and resource categories, respectively. This would allow the invention to be generalized to other embodiments, but would not entail any revision to the solution offered. It is believed that most yield management systems can be described in the general terms given above.

In summary, an airline seat reservation system has been described wherein seat reservations are controlled using, in part, a seat inventory control system. The seat reservation control, based on a concept termed Network-Based Expected Marginal Seat Revenue (EMSR), does not require the large number of variables required by the other network-based approaches, and it incorporates a probabilistic demand model without resorting to computationally intractable integer programming. The computer-based seat inventory control system uses leg-based methods to control bookings in a flight network comprised of a plurality of itinerary/fare class combinations using a plurality of flight legs. When considering a particular flight leg, the total fare paid by a using the leg is discounted by taking into account the displacement cost of the travel on the other legs of the itinerary to create a virtual fare. Expected marginal seat revenues provide the displacement cost on the legs when computing virtual fares. Using these EMSR-dependent virtual fares, a leg-based optimization method is applied to the virtual fares to obtain network-optimal results.

The foregoing descriptions of the preferred embodiments of the invention have been presented for the purposes of illustration and description. These preferred embodiments are not intended to be exhaustive nor to limit the invention to the precise forms disclosed. Many modifications and variations are possible in light of the above teaching. It is intended that the scope of the invention be limited not by this detailed description, but rather by the claims appended thereto.

TABLE 1

| Method | Comparison Of Seat Allocation Methods | | | |
| --- | --- | --- | --- | --- |
| | Optimal Basis | Demand Characteristics | Number Of Variables | Computational Complexity |
| Leg-based EMSR | Leg | Stochastic | Small | Linear |
| Virtual-Nesting EMSR | Leg | Stochastic | Small | Linear |
| Deterministic LP | Network | Deterministic | Large | Large Polynomial |
| Probabilistic LP | Network | Stochastic | Very Large | Exponential |
| Network-Based EMSR | Network | Stochastic | Small | Small Polynomial |

What is claimed is:

1. An airline seat reservation system, comprising:
   (a) a programmed computer;
   (b) data storage means, connected to the programmed computer, for storing a database describing a flight network and seat reservation requests, the flight network comprising a plurality of flight legs a, and itinerary p and fare class i combinations, each flight leg a having a residual seating capacity $C_a$, and each itinerary p and fare class i combination having a revenue yield $f^i_p$ for a seat reserved therein;
   (c) the programmed computer comprising seat assignment means for processing the database describing the flight network to assign seats in a flight leg a to one or more itinerary p and fare class i combinations, the seat assignment means comprising:
   (1) means for calculating an initial expected marginal seat revenue (EMSR) $\lambda_a$ for all flight legs a;
   (2) means for computing an unnested EMSR-prorated virtual fare $v^i_{p,a}$ for every itinerary p and fare class i combination that contains a particular flight leg a having a nonzero residual seating capacity $C_a$ so that:

$$v^i_{p,a} \stackrel{\Delta}{=} \frac{f^i_p \lambda_a}{\sum\limits_{b \in p} \lambda_b}$$

(3) means for calculating a new EMSR $\lambda_a$ for the particular flight leg a based on the virtual fares $v^i_{p,a}$ by applying Newton's method to a seating capacity constraint for the particular flight leg a:

$$\sum_{\substack{p \\ a \in p, v^i_{p,a} > \lambda_a}} \sum_i Q^i_p(\lambda_a / v^i_{p,a}) = C_a$$

wherein $Q^i_p$ is an inverse of a cumulative probability density function of demand for fare class i travel on itinerary p, thereby ensuring that a total number of seats assigned to the itinerary p and fare class i combinations are equal to the residual seating capacity of the particular flight leg a, wherein the virtual fares $v^i_{p,a}$ are updated at each step of the Newton's method since each step changes the EMSR $\lambda_a$ for the particular flight leg a;

(4) means for converging the EMSR $\lambda_a$ for the particular flight leg a;

(5) means for terminating the seat assignment means when the changes in the EMSR's $\lambda_a$'s for all flight legs a are insignificant;

(d) reservation terminal means, operatively connected to the programmed computer, for entering a seat reservation request for a particular itinerary p and fare class i combination; and (e) the programmed computer comprising reservation means for receiving the seat reservation request for the particular itinerary p and fare class i combination from the reservation terminal means, for accepting the seat reservation request in accordance with a value selected from a group comprising at least one of the following: a globally optimal set of EMSR's $\lambda_a$'s and the total number of seats assigned to the itinerary pa nd fare class i combinations for recording the seat reservation request in the database, and for transmitting an electronic status indication of the seat reservation request from the computer to the reservation terminal means.

2. The apparatus of claim 1, wherein the means for calculating further comprises means for performing a binary search when the EMSR $\lambda_a$ fails to converge with Newton's method.

3. The apparatus of claim 1, wherein the means for terminating further comprises means for terminating the seat assignment means when the changes in EMSR's $\lambda_a$'s for all flight legs a are less than a tolerance value.

4. The apparatus of claim 1, wherein the reservation means further comprises means for accepting the seat reservation request when the total number of seats assigned to the itinerary p and fare class i combinations is not exceeded.

5. The apparatus of claim 1, wherein the reservation means further comprises means for accepting the seat reservation request when the seat reservation request would yield revenue greater than or equal to a sum of the EMSR's $\lambda_a$'s for all flight legs a in the itinerary p.

6. An airline seat reservation system, comprising:

(a) a programmed computer;

(b) data storage means, connected to the programmed computer, for storing a database describing a flight network and seat reservation requests, the flight network comprising a plurality of flight legs a, and itinerary p and fare class i combinations, each flight leg a having a residual seating capacity $C_a$, and each itinerary p and fare class i combination having a revenue yield $f^i_p$ for a seat reserved therein;

(c) the programmed computer comprising seat assignment means for processing the database describing the flight network to assign seats in a flight leg a to one or more itinerary p and fare class i combinations, the seat assignment means comprising:

(i) means for calculating an initial expected marginal sat revenue (EMSR) $\lambda_a$ for all the flight legs a;

(2) means for computering a nested EMSR-prorated virtual fare $v^i_{p,a}$ for each itinerary p and fare class i combination that contains a particular flight leg a having a nonzero residual seating capacity $C_a$ so that:

$$v^i_{p,a} \overset{\Delta}{=} \frac{f^i_p \lambda_a}{\sum_{b \in p} \lambda_b}$$

(3) means for sorting the itinerary p and fare class i combinations into a list ordered by descending values of virtual fares $v^i_{p,a}$;

(4) means for processing the sorted list of virtual fares $v^i_{p,a}$ one-by-one to find an intersection point defining a new EMSR $\lambda_a$ for the particular flight leg a between functions:

$$\lambda_a = x$$

$$\lambda_a = \sum_{f^j_a \geq x} f^j_a (\pi_j - \pi_{j-1})$$

wherein x is an independent variable, $f^j_a$ is a jth largest virtual fare on leg a, and $\pi_j$ is a probability that more than $C_a$ passengers are willing to pay $f^j_a$ or more to travel on leg a;

(5) means for converging the EMSR $\lambda_a$ for the particular flight leg a;

(6) means for terminating the seat assignment means when the changes in the EMSR's $\lambda_a$'s for all flight legs a are insignificant;

(d) reservation terminal means, operatively connected to the programmed computer, for entering a seat reservation request for a particular itinerary p and fare class i combination; and (e) the programmed computer comprising reservation means for receiving the seat reservation request for the particular itinerary p and fare class i combination from the reservation terminal means, for accepting the seat reservation request in accordance with a globally optimal set of EMSR's $\lambda_a$'s, for recording the seat reservation request in the database, and for transmitting an electronic status indication of the seat reservation request from the computer to the reservation terminal means.

7. The apparatus of claim 6, wherein the means for terminating further comprises means for terminating the seat assignment means when the changes in EMSR's $\lambda_a$'s for all flight legs a are less than a tolerance value.

8. The apparatus of claim 6, wherein the reservation means further comprises means for accepting the seat reservation request when the seat reservation request would yield revenue greater than or equal to a sum of the EMSR's $\lambda_a$'s for all flight legs a in the itinerary p.

9. An airline seat reservation system, comprising:

(a) a programmed computer;

(b) data storage means, connected to the programmed computer, for storing a database describing a flight network and seat reservation requests, the flight network comprising a plurality of flight legs a, and itinerary p and fare class i combinations, each flight leg a having a residual seating capacity $C_a$, and each itinerary p and fare class i combination having a revenue yield $f^i_p$ for a seat reserved therein;

(c) the programmed control comprising seat assignment means for processing the database describing the flight network to assign seats in a flight leg a to one or more itinerary p and fare class i combinations, the seat assignment means comprising:

(1) means for calculating an initial expected marginal seat revenue (EMSR) $\lambda_a$ for all the flight legs a;

(2) means for computing a nested EMSR-differential virtual fare $v^i_{p,a}$ for each itinerary p and fare class i combination that contains a particular flight leg a having a nonzero residual seating capacity $C_a$ so that:

$$v^j_{p,a} \stackrel{\Delta}{=} f_p^i - \sum_{\substack{b \in p \\ b \neq a}} \lambda_b$$

(3) means for sorting the itinerary p and fare class i combinations into a list ordered by descending virtual fares $v^i_{p,a}$ for the particular flight leg a;

(4) means for processing the sorted list of virtual fares $v^i_{p,a}$ one-by-one to find an intersection point defining a new EMSR $\lambda_a$ for the particular flight leg a between functions:

$$\lambda_a = x$$

$$\lambda_a = \sum_{f_a^j \geq x} f_a^j (\pi_j - \pi_{j-1})$$

wherein x is an independent variable, $f^j_a$ is a jth largest virtual fare on leg a, and $\pi_j$ is a probability that more than $C_a$ passengers are willing to pay the virtual fare $f^j_a$ or more to travel on leg a;

(5) means for terminating the seat assignment means when the changes in the EMSR's $\lambda_a$'s for all flight legs a are insignificant;

(d) reservation terminal means, operatively connected to the programmed computer, for entering a seat reservation request for a particular itinerary p and fare class i combination; and (e) the programmed computer comprising reservation means for receiving the seat reservation request for the particular itinerary p and fare class i combination from the reservation terminal means, for accepting the seat reservation request in accordance with a globally optimal set of EMSR's $\lambda_a$'s, for recording the seat reservation request in the database, and for transmitting an electronic status indication of the seat reservation request to the reservation terminal means.

10. The apparatus of claim 9, wherein the means for terminating further comprises means for terminating the seat assignment means when the changes in EMSR's $\lambda_a$'s for all flight legs a are less than a tolerance value.

11. The apparatus of claim 9, wherein the reservation means further comprises means for accepting the seat reservation request when the seat reservation request would yield revenue greater than or equal to a sum of the EMSR's $\lambda_a$ s for all flight legs a in the itinerary p.

12. A system for allocating physical resources, comprising:

(a) a computer;

(b) data storage means, connected to the computer, for storing a database describing a known resource capacity for each of a plurality of resource categories a, a known demand distribution for each of a plurality of demand categories z, a known revenue yield for a resource reserved within each demand category z, and a booking limit for each demand category z;

(c) the computer comprising resource assignment means for processing the database to assign resources in a resource category a to one or more demand categories z, the resource assignment means comprising:

(1) means for calculating an initial expected marginal resource revenue (EMRR) $\lambda_a$ for all resource categories a;

(2) means for computing an unnested EMRR-prorated virtual price $v_{z,a}$ for every demand category z that contains a particular resource category a having a nonzero residual capacity $C_a$ so that:

$$v_{z,a} \stackrel{\Delta}{=} \frac{f_z \lambda_a}{\sum_{b \in z} \lambda_b}$$

(3) means for calculating a new EMRR $\lambda_a$ for the particular demand category a based on the virtual prices $v_{z,a}$ by applying Newton's method to a resource capacity constraint for the particular resource category a:

$$\sum_{\substack{a \in z \\ v_{z,a} > \lambda_a}}^{z} Q_z(\lambda_a / v_{z,a}) = C_a$$

wherein $Q_z$ is an inverse of a cumulative probability density function of demand for demand category z, thereby ensuring that a total number of resources assigned to the demand category z are equal to the residual capacity $C_a$ of the particular resource category a, wherein the virtual prices $v_{z,a}$ are updated at each step of the Newton's method since each step changes the EMRR $\lambda_a$ for the particular resource category a;

(4) means for converging the EMRR $\lambda_a$ for the particular resource category a;

(5) means for terminating the resource assignment means when the changes in the EMRR's $\lambda_a$'s for all resource categories a are insignificant;

(d) reservation terminal means, operatively connected to the computer, for entering a resource reservation request for a particular demand category z; and (e) the computer comprising reservation means, for receiving the resource reservation request for the particular demand category z from the reservation terminal means, for accepting the resource reservation request in accordance with a globally optimal set of EMRR's $\lambda_a$'s, for recording the resource reservation request in the database, and for transmitting an electronic status indication of the resource reservation request to the reservation terminal means.

13. The apparatus of claim 12, wherein the means for calculating further comprises means for performing a binary search when the EMRR $\lambda_a$ fails to converge with Newton's method.

14. The apparatus of claim 12, wherein the means for terminating further comprises means for terminating the resource assignment means when the changes in EMRR's $\lambda_a$'s for all resource categories a are less than a tolerance value.

15. The apparatus of claim 12, wherein the reservation means further comprises means for accepting the resource reservation request when the total number of resources assigned to the demand categories z is not exceeded.

16. The apparatus of claim 12, wherein the reservation means further comprises means for accepting the resource reservation request when the resource reservation request would yield revenue greater than or equal to a sum of the EMRR's $\lambda_a$'s for all resource categories a in the demand categories z.

17. A system for allocating physical resources, comprising:
(a) a computer;
(b) data storage means, connected to the computer, for storing a database describing a known resource capacity for each of a plurality of resource categories a, a known demand distribution for each of a plurality of demand categories z, a known revenue yield for a resource reserved within each demand category z and a booking limit for each demand category z;
(c) the computer comprising resource assignment means for processing the database to assign resources in a resource category a to one or more demand categories z, the resource assignment means comprising:
(1) means for calculating an initial expected marginal resource revenue (EMRR) $\lambda_a$ for all the resource categories a;
(2) means for computering a nested EMRR-prorated virtual price $v_{z,a}$ for each demand category z that contains a particular resource category a having a nonzero residual capacity $C_a$ so that:

$$v_{z,a} \stackrel{\Delta}{=} \frac{f_p \lambda_a}{\sum_{b \in z} \lambda_b}$$

(3) means for sorting the demand categories z into a list ordered by descending values of virtual prices $v_{z,a}$;
(4) means for processing the sorted list of virtual prices $v_{z,a}$ one-by-one to find an intersection point defining a new EMRR $\lambda_a$ for the particular resource category a between functions:

$$\lambda_a = x$$

$$\lambda_a = \sum_{f_d \geq x} f_d^j (\pi_j - \pi_{j-1})$$

wherein x is an independent variable, $\hat{v}_a$ is a jth largest virtual price in resource category a, and $\pi_j$ is a probability that more than $C_a$ customers are willing to pay $\hat{v}_a$ or more for a reservation in resource category a;
(5) means for converging the EMRR $\lambda_a$ for the particular resource categories a;
(6) means for terminating the resource assignment means when the changes in the EMRR's $\lambda_a$'s for all resource categories a are insignificant;
(d) reservation terminal means, operatively connected to the computer, for entering a resource reservation request for a particular demand category z; and
(e) the computer comprising reservation means for receiving the resource reservation request for the particular demand category z from the reservation terminal means, for accepting the resource reservation request in accordance with a globally optimal set of EMRR's $\lambda_a$'s, for recording the resource reservation request in the database, and for transmitting an electronic status indication of the resource reservation request to the reservation terminal means.

18. The apparatus of claim 17, wherein the means for terminating further comprises means for terminating the resource assignment means when the changes in EMRR's $\lambda_a$'s for all resource categories a are less than a tolerance value.

19. The apparatus of claim 17, wherein the reservation means further comprises means for accepting the resource reservation request when the resource reservation request would yield revenue greater than or equal to a sum of the EMRR's $\lambda_a$'s for all resource categories a in the demand category z.

20. A system for allocating physical resources, comprising:
(a) a computer;
(b) data storage means, connected to the computer, for storing a database describing a known resource capacity for each of a plurality of resource categories a, a known demand distribution for each of a plurality of demand categories z, a known revenue yield for a resource reserved within each demand category a, and a booking limit for each demand category z;
(c) the computer comprising resource assignment means for processing the database to assign resources in a resource category a to one or more demand categories z, the resource assignment means comprising:
(1) means for calculating an initial expected marginal resource revenue (EMRR) $\lambda f_a$ for all the resource categories a;
(2) means for computing a nested EMRR-differential virtual price $v_{z,a}$ for each demand category z that utilizes a particular resource category a having a nonzero residual capacity $C_a$ so that:

$$v_{z,a} \stackrel{\Delta}{=} f_p - \sum_{\substack{b \in z \\ b \neq a}} \lambda_b$$

(3) means for sorting the demand categories z into a list ordered by descending virtual prices $v_{z,a}$;
(4) means for processing the sorted list of virtual prices $v_{z,a}$ one-by-one to find an intersection point defining a new EMRR $\lambda_a$ for the particular resource category a between functions:

$$\lambda_a = x$$

$$\lambda_a = \sum_{f_d \geq x} f_d^j (\pi_j - \pi_{j-1})$$

wherein x is an independent variable, $\hat{v}_a$ is a jth largest virtual price in resource category a, and $\pi_j$ is a probability that more than $C_a$ customers are willing to pay the virtual price $\hat{v}_a$ or more for a for a reservation in resource category a;

(5) means for terminating the resource assignment means when the changes in the EMRR's $\lambda_a$'s for all resource categories a are insignificant;

(d) reservation terminal means, operatively connected to the computer, for entering a resource reservation request for a particular demand category z; and (e) The computer comprising reservation means for receiving the resource reservation request for the particular demand category z from the reservation terminal means, for accepting the resource reservation request in accordance with a globally optimal set of EMRR's $\lambda_a$'s, for recording the resource reservation request in the database, and for transmitting an electronic status indication of the resources reservation request to the reservation terminal means.

21. The apparatus of claim 20, wherein the means for terminating further comprises means for terminating the resource assignment means when the changes in EMRR's $\lambda_a$'s for all resource categories a are less than a tolerance value.

22. The apparatus of claim 20, wherein the reservation means further comprises means for accepting the resource reservation request when the resource reservation request would yield revenue greater than or equal to a sum of the EMRR's $\lambda_a$'s for all resource categories a in the demand category z.

* * * * *

UNITED STATES PATENT AND TRADEMARK OFFICE
CERTIFICATE OF CORRECTION

PATENT NO. : 5,270,921                    Page 1 of 4
DATED       : December 14, 1993
INVENTOR(S) : Scot W. Hornick It is certified that error appears in the above-indentified patent and that said Letters Patent is hereby corrected as shown below:

In column 3, line 20, delete "combined are" after the word --is--.

In column 6, line 4, "$f_a^j \underline{\geq} x$" should read --$f_a^j \geq x$--.

In column 6, line 36, "$f_a^j \underline{\geq} x$" should read --$f_a^j \geq x$--.

In column 8, line 43, delete "15" after the word --fare--.

In column 9, line 39, "$\underline{\geq}$" should read --$\geq$--.

In column 9, line 52, "$\underline{\geq}$" should read --$\geq$--.

In column 9, line 52, "$E_{i-1})$" should read --$\overline{E}_{i-1})$--.

In column 9, line 59, "$E_{i-1})$" should read --$\overline{E}_{i-1})$--.

In column 9, line 60, "$\underline{\geq}$" should read --$\geq$--.

In column 9, line 67, "$\underline{\geq}$" should read --$\geq$--.

In column 10, line 8, "$\underline{\geq}$" should read --$\geq$--.

In column 11, line 2, "F s" should read --F's--.

In column 12, line 46, "√2" should read --$\sqrt{2}$--.

In column 17, line 14, "√2" should read --$\sqrt{2}$--.

UNITED STATES PATENT AND TRADEMARK OFFICE
CERTIFICATE OF CORRECTION

PATENT NO. : 5,270,921                   Page 2 of 4
DATED      : December 14, 1993
INVENTOR(S): Scot W. Hornick It is certified that error appears in the above-indentified patent and that said Letters Patent is hereby corrected as shown below:

In column 23, line 7-8, "$\sqrt{2}$ (CUM-VAR))" should read -- $\sqrt{2(CUM-VAR)}$ )--.

In column 25, line 20, "pa nd" should read --p and--.

In column 25, line 61, "(i)" should read --(1)--.

In column 25, line 62, "sat" should read --seat--.

In column 25, line 64, "computering" should read --computing--.

In column 26, line 18, "$\underset{=}{>}$" should read --$\geq$--.

In column 26, line 20, "$f_a{}^j$" should read -- $f_a^j$ --.

In column 26, line 23, "$j_a$" should read -- $f_a^j$ --.

In column 27, line 27, "$\underset{=}{>}$" should read --$\geq$--.

In column 27, line 29, "$f_a{}^j$" should read -- $f_a^j$ --.

In column 27, line 32, "$f_a{}^j$" should read -- $f_a^j$ --.

In column 27, line 59, "$\lambda_a$ s" should read --$\lambda_a$'s--.

UNITED STATES PATENT AND TRADEMARK OFFICE
CERTIFICATE OF CORRECTION

PATENT NO. : 5,270,921   Page 3 of 4
DATED : December 14, 1993
INVENTOR(S) : Scot W. Hornick It is certified that error appears in the above-indentified patent and that said Letters Patent is hereby corrected as shown below:

In column 29, line 53, "$\geq$" should read --$\geq$--.

In column 29, line 55, "$f_a^j$" should read -- $f_a^j$ --.

In column 29, line 58, "$f_a^j$" should read -- $f_a^j$ --.

In column 30, line 31, "a" should read --z--.

In column 30, line 40, "$\lambda f_a$" should read --$\lambda_a$--.

In column 30, line 62, "$\geq$" should read --$\geq$--.

In column 30, line 64, "$f_a^j$" should read -- $f_a^j$ --.

In column 30, line 67, "$f_a^j$" should read -- $f_a^j$ --.

UNITED STATES PATENT AND TRADEMARK OFFICE
CERTIFICATE OF CORRECTION

PATENT NO. : 5,270,921
DATED : December 14, 1993
INVENTOR(S) : Scot W. Hornick

It is certified that error appears in the above-indentified patent and that said Letters Patent is hereby corrected as shown below:

Column 31, line 8, "The" should read —the—.

Signed and Sealed this

Twenty-ninth Day of November, 1994

Attest:

BRUCE LEHMAN

Attesting Officer

Commissioner of Patents and Trademarks